US007136991B2

(12) United States Patent
Henry et al.

(10) Patent No.: US 7,136,991 B2
(45) Date of Patent: Nov. 14, 2006

(54) MICROPROCESSOR INCLUDING RANDOM NUMBER GENERATOR SUPPORTING OPERATING SYSTEM-INDEPENDENT MULTITASKING OPERATION

(76) Inventors: G. Glenn Henry, 411 Lake Cliff Trail, Austin, TX (US) 78746; Arturo Martin-de-Nicolas, 8104 Bell Mountain Dr., Austin, TX (US) 78730; Terry Parks, #6 Carriage House La., Austin, TX (US) 78737

( * ) Notice: Subject to any disclaimer, the term of this patent is extended or adjusted under 35 U.S.C. 154(b) by 725 days.

(21) Appl. No.: 10/300,931

(22) Filed: Nov. 20, 2002

(65) Prior Publication Data
US 2003/0131217 A1 Jul. 10, 2003

Related U.S. Application Data

(60) Provisional application No. 60/334,281, filed on Nov. 20, 2001.

(51) Int. Cl.
G06F 9/48 (2006.01)
(52) U.S. Cl. ...................... 712/228; 708/250
(58) Field of Classification Search ............... 714/728, 714/739; 708/250–256; 712/228
See application file for complete search history.

(56) References Cited

U.S. PATENT DOCUMENTS

| | | | |
|---|---|---|---|
| 3,706,941 A | 12/1972 | Cohn | |
| 4,063,220 A | 12/1977 | Metcalfe et al. | |
| 4,375,620 A | 3/1983 | Singer et al. | |
| 4,513,386 A | 4/1985 | Glazer | |
| 4,780,814 A | 10/1988 | Hayek | |
| 5,163,132 A | 11/1992 | DuLac et al. | |
| 5,251,165 A * | 10/1993 | James, III | 708/250 |
| 5,257,282 A | 10/1993 | Adkisson et al. | |
| 5,446,683 A | 8/1995 | Mullen et al. | |
| 5,528,526 A | 6/1996 | Klug et al. | |
| 5,532,695 A | 7/1996 | Park et al. | |
| 5,757,923 A | 5/1998 | Koopman, Jr. | |
| 6,160,755 A | 12/2000 | Norman et al. | |
| 6,199,156 B1 | 3/2001 | Yoder et al. | |
| 6,247,082 B1 | 6/2001 | Lo et al. | |
| 6,442,579 B1 | 8/2002 | Hansson | |
| 6,594,680 B1 | 7/2003 | Gu et al. | |
| 6,643,740 B1 | 11/2003 | Auracher | |
| 6,816,876 B1 | 11/2004 | Jha et al. | |
| 6,871,206 B1 | 3/2005 | Henry et al. | |

(Continued)

FOREIGN PATENT DOCUMENTS

EP 0172405 A 2/1986

(Continued)

OTHER PUBLICATIONS

Trichina, Elena et al., Supplemental Cryptographic Hardware for Smart Cadrs, IEEE Micro, Nov.-Dec. 2001, pp. 26-35.*

(Continued)

Primary Examiner—Richard L. Ellis

(57) ABSTRACT

A microprocessor that includes a random number generator (RNG) that saves and restores its own state on a task switch without operating system (OS) support. The RNG includes a control and status register (CSR) for storing control values that affect the generation of random numbers. The CSR is not saved and restored by the OS. The RNG shadows the CSR with an SSE register that is saved and restored by the OS. A new instruction loads the CSR, and also loads the shadowed SSE register. Whenever the SSE register is restored from memory, the RNG sets a flag indicating that a possible task switch occurred. Whenever the processor executes a new instruction that stores the random data to memory, it checks the flag and copies the control values from the SSE register to the CSR if the flag is true, discards previously generated bytes, and restarts random number generation.

29 Claims, 17 Drawing Sheets

U.S. PATENT DOCUMENTS

| | | |
|---|---|---|
| 6,947,960 B1 | 9/2005 | Hars |
| 2001/0056534 A1 | 12/2001 | Roberts |
| 2002/0124032 A1 | 9/2002 | Karp |
| 2002/0172359 A1 | 11/2002 | Saarinen |
| 2003/0131217 A1 | 7/2003 | Henry et al. |
| 2003/0149863 A1 | 8/2003 | Henry et al. |
| 2003/0158876 A1 | 8/2003 | Hars |
| 2004/0019619 A1 | 1/2004 | Buer et al. |
| 2004/0019798 A1 | 1/2004 | Ishil |
| 2004/0096060 A1 | 5/2004 | Henry et al. |
| 2004/0098429 A1 | 5/2004 | Henry et al. |
| 2004/0103131 A1 | 5/2004 | Henry et al. |
| 2004/0158591 A1 | 8/2004 | Crispin |

FOREIGN PATENT DOCUMENTS

| | | |
|---|---|---|
| EP | 0285310 A | 10/1988 |
| EP | 0415862 A | 3/1991 |
| JP | 04140828 A | 5/1992 |
| JP | 2003108365 A | 4/2003 |
| WO | WO 99/14881 | 3/1999 |
| WO | WO 02/01328 | 1/2002 |

OTHER PUBLICATIONS

Ancona, Fabio et al., Parallel VLSI Architectures for Cryptographic Systems, IEEE, 1997, pp. 176-181.*

Federal Information Processing Standard Publication, FIPS PUB 140-2, Security Requirements for Cryptographic Modules, May 25, 2001, Gaithersburg, MD.

Intel 82802AB/82802AC Firmware Hub (FWH), Nov. 2000, Document No. 290658-004.

Benjamin Jun, The Intel Random Number Generator, Cryptography Research, Inc. White Paper Prepared for Intel Corporation, Apr. 22, 1999.

Analog Devices ADSP-2141L Safe Net DSP datasheet, Rev. 0, Analog Devices, Inc., 2000. Norwood, MA.

Rukhin A *A Statistical Test Suite for Random and Pseudorandom Number Generators for Cryptographic Applications* NIST Special Publication, Gaithersburg, MD, US. No. 800-22. May 15, 2001. XP002276676 ISSN: 1048-776X.

Atmel Secure Microcontroller for Smart Cards AT05SC3208R. Data Sheet, pp. 1-2, XP002288710 Section "Peripherals".

Gammel B M: Hurst's rescaled range statistical analysis for pseudorandom number generator used in physical simulations: Physical review E, vol. 58, No. 2, Aug. 1998 (1998008) pp. 2586-2597, XP002288808 *p. 2589. ;left-hand column, line 4-line 12.

IA-32 Intel Architecture Software Developer's Manual, vol. 2: Instruction Set Reference, 2001 pp. 3-114 to 3-127, 3-670 to 3-671, 3-785 to 3-786.

* cited by examiner

*Microprocessor*

RNG-Related Registers

RNG Unit Operation (load of XMM0)

RNG Unit Operation (XLOAD XMM0 instruction)

XLOAD instruction

XSTORE instruction

RNG Unit Operation (XSTORE XMM5 instruction)

Multitasking Operation

Multitasking Operation

String Filter

*String Filter Operation*

XSTORE instruction (Alternate Embodiment)

Multi-Buffering Operation

RNG Unit Operation (XLOAD XMM0 instruction)
*Alternate Embodiment*

RNG Unit Operation (XSTORE XMM5 instruction)
Alternate Embodiment

XSTORE xmm3, xmm5

XSTORE instruction (Alternate Embodiment)

REP XSTORE instruction

MICROPROCESSOR INCLUDING RANDOM NUMBER GENERATOR SUPPORTING OPERATING SYSTEM-INDEPENDENT MULTITASKING OPERATION

This application claims priority based on U.S. Provisional Application, Ser. No. 60/334,281, filed Nov. 20, 2001, entitled XUNIT. DUAL REGISTER ARCHITECTURE. MASTER PATENT ADDS NEW FUNCTIONAL UNIT TO X86 INSTRUCTION SET.

This application is related to the following co-pending U.S. patent applications, which are filed on the same day as this application, and which have a common assignee and common inventors.

| Ser. No. | Title |
| --- | --- |
| 10/300,933 | RANDOM NUMBER GENERATOR BIT STRING FILTER |
| 10/300,932 | CONTINUOUS MULTI-BUFFERING RANDOM NUMBER GENERATOR |
| 10/300,922 | RANDOM NUMBER GENERATOR WITH SELF-TYPING DATA |

FIELD OF THE INVENTION

This invention relates in general to the field of random number generation, and particularly to use of a random number generator in a microprocessor running a multitasking operating system.

BACKGROUND OF THE INVENTION

Historically, many computer software applications require a supply of random numbers. For example, Monte Carlo simulations of physical phenomena, such as large-scale weather simulations, require a supply of random numbers in order to simulate physical phenomenon. Other examples of applications requiring random numbers are casino games and on-line gambling to simulate card shuffling, dice rolling, etc.; lottery number creation; the generation of data for statistical analysis, such as for psychological testing; and use in computer games.

The quality of randomness needed, as well as the performance requirements for generating random numbers, differs among these types of applications. Many applications such as computer games have trivial demands on quality of randomness. Applications such as psychological testing have more stringent demands on quality, but the performance requirements are relatively low. Large-scale Monte Carlo-based simulations, however, have very high performance requirements and require good statistical properties of the random numbers, although non-predictability is not particularly important. Other applications, such as on-line gambling, have very stringent randomness requirements as well as stringent non-predictability requirements.

While these historical applications are still important, computer security generates the greatest need of high-quality random numbers. The recent explosive growth of PC networking and Internet-based commerce has significantly increased the need for a variety of security mechanisms.

High-quality random numbers are essential to all major components of computer security, which are confidentiality, authentication, and integrity.

Data encryption is the primary mechanism for providing confidentiality. Many different encryption algorithms exist, such as symmetric, public-key, and one-time pad, but all share the critical characteristic that the encryption/decryption key must not be easily predictable. The cryptographic strength of an encryption system is essentially the strength of the key, i.e., how hard it is to predict, guess, or calculate the decryption key. The best keys are long truly random numbers, and random number generators are used as the basis of cryptographic keys in all serious security applications.

Many successful attacks against cryptographic algorithms have focused not on the encryption algorithm but instead on its source of random numbers. As a well-known example, an early version of Nets cape's Secure Sockets Layer (SSL) collected data from the system clock and process ID table to create a seed for a software pseudo-random number generator. The resulting random number was used to create a symmetric key for encrypting session data. Two graduate students broke this mechanism by developing a procedure for accurately guessing the random number to guess the session key in less than a minute.

Similar to decryption keys, the strength of passwords used to authenticate users for access to information is effectively how hard it is to predict or guess the password. The best passwords are long truly random numbers. In addition, in authentication protocols that use a challenge protocol, the critical factor is for the challenge to be unpredictable by the authenticating component. Random numbers are used to generate the authentication challenge.

Digital signatures and message digests are used to guarantee the integrity of communications over a network. Random numbers are used in most digital signature algorithms to make it difficult for a malicious party to forge the signature. The quality of the random number directly affects the strength of the signature. In summary, good security requires good random numbers.

Numbers by themselves are not random. The definition of randomness must include not only the characteristics of the numbers generated, but also the characteristics of the generator that produces the numbers. Software-based random number generators are common and are sufficient for many applications. However, for some applications software generators are not sufficient. These applications require hardware generators that generate numbers with the same characteristics of numbers generated by a random physical process. The important characteristics are the degree to which the numbers produced have a non-biased statistical distribution, are unpredictable, and are irreproducible.

Having a non-biased statistical distribution means that all values have equal probability of occurring, regardless of the sample size. Almost all applications require a good statistical distribution of their random numbers, and high-quality software random number generators can usually meet this requirement. A generator that meets only the non-biased statistical distribution requirement is called a pseudo-random number generator.

Unpredictability refers to the fact that the probability of correctly guessing the next bit of a sequence of bits should be exactly one-half, regardless of the values of the previous bits generated. Some applications do not require the unpredictability characteristic; however, it is critical to random number uses in security applications. If a software generator is used, meeting the unpredictability requirement effectively requires the software algorithm and its initial values be hidden. From a security viewpoint, a hidden algorithm approach is very weak. Examples of security breaks of software applications using a predictable hidden algorithm random number generator are well known. A generator that meets both the first two requirements is called a cryptographically secure pseudo-random number generator.

In order for a generator to be irreproducible, two of the same generators, given the same starting conditions, must produce different outputs. Software algorithms do not meet this requirement. Only a hardware generator based on random physical processes can generate values that meet the stringent irreproducibility requirement for security. A generator that meets all three requirements is called a truly random number generator.

Software algorithms are used to generate most random numbers for computer applications. These are called pseudo-random number generators because the characteristics of these generators cannot meet the unpredictability and irreproducibility requirements. Furthermore, some do not meet the non-biased statistical distribution requirements.

Typically, software generators start with an initial value, or seed, sometimes supplied by the user. Arithmetic operations are performed on the initial seed to produce a first random result, which is then used as the seed to produce a second result, and so forth. Software generators are necessarily cyclical. Ultimately, they repeat the same sequence of output. Guessing the seed is equivalent to being able to predict the entire sequence of numbers produced. The irreproducibility is only as good as the secrecy of the algorithm and initial seed, which may be an undesirable characteristic for security applications. Furthermore, software algorithms are reproducible because they produce the same results starting with the same input. Finally, software algorithms do not necessarily generate every possible value within the range of the output data size, which may reflect poorly in the non-biased statistical distribution requirement.

A form of random number generator that is a hybrid of software generators and true hardware generators is an entropy generator. Entropy is another term for unpredictability. The more unpredictable the numbers produced by a generator, the more entropy it has. Entropy generators apply software algorithms to a seed generated by a physical phenomenon. For example, a highly used PC encryption program obtains its seed by recording characteristics of mouse movements and keyboard keystrokes for several seconds. These activities may or may not generate poor entropy numbers, and usually require some user involvement. The most undesirable characteristic of most entropy generators is that they are very slow to obtain sufficient entropy.

It should be clear from the foregoing that certain applications, including security applications, require truly random numbers which can only be generated by a random physical process, such as the thermal noise across a semiconductor diode or resistor, the frequency instability of a free-running oscillator, or the amount a semiconductor capacitor is charged during a particular time period. These types of sources have been used in several commercially available add-in random number generator devices, such as PCI cards and serial bus devices. None of these devices have enjoyed much commercial use, apparently because they are either relatively slow or relatively expensive.

One solution to providing an inexpensive, high-performance hardware random number generator would be to incorporate it within a microprocessor. The random number generator could utilize random physical process sources such as those discussed above, and would be relatively inexpensive, since it would be incorporated into an already existing semiconductor die. One obstacle that may need to be overcome by adding a new feature to a microprocessor is obtaining operating system support for the new feature.

Most desirable operating systems support the notion of multitasking. An operating system is multitasking if it allows multiple programs or tasks to share time executing on the processor. That is, the operating system allows one task to have control of the microprocessor to execute for a period of time, then the operating system allows another task to have control of the microprocessor to execute for a next period of time, and so on. Each of the tasks has a state associated with it, such as the value of the microprocessor registers used by the task. To facilitate multitasking, the operating system saves the state of the task being switched out to memory, and restores the state of the task being switched to from memory, where it was previously saved when it was switched out.

If a new feature being added to a microprocessor, such as a random number generator, includes state information, such as values stored in new registers accessible by software program instructions, the state must be maintained across a task switch by the operating system if more than one task is to use the new feature. Although operating system vendors will eventually add support for saving and restoring the state of the new feature, they may be relatively slow in doing so. If the new feature is desirable, such as a fast, truly random number generator, applications may want to use the feature before the operating system includes the support.

Therefore, what is needed is a microprocessor that includes a mechanism within itself for saving and restoring the state of its random number generator.

SUMMARY

The present invention provides a microprocessor that includes an apparatus and method for saving and restoring the state of its hardware random number generator without support from the operating system. Accordingly, in attainment of the aforementioned object, it is a feature of the present invention to provide a microprocessor, for running a multitasking operating system. The microprocessor has a memory coupled to the microprocessor. The microprocessor includes a register that is saved and restored by the operating system on a task switch. The microprocessor also includes a flag register, coupled to the register, that stores a flag which, if set, indicates that a task switch possibly occurred. The microprocessor sets the flag when it executes an instruction that loads the register. The microprocessor also includes a random number generator (RNG), coupled to the register, which generates random numbers based on one or more control values stored in a control register. The control register is not saved and restored by the operating system on a task switch. The microprocessor includes a first instruction for loading the values into the control register and also for loading the values into the register. The microprocessor also includes a second instruction for storing the random numbers to the memory and for copying the values from the register to the control register if the flag is set.

In another aspect, it is a feature of the present invention to provide a method for enabling multiple software applications to use a random number generator (RNG) in a microprocessor that is executing a multitasking operating system (OS) that does not provide for saving and restoring state of the RNG during task switches. The method includes a first task loading an RNG register and a non-RNG register with a first value, the OS saving the first value from the non-RNG register to a memory coupled to the microprocessor, a second task loading the RNG register with a second value after the OS saves the first value, and the OS restoring the first value from the memory to the non-RNG register. The method also includes the RNG copying the first value from the non-RNG register to the RNG register after the OS restores the first value from the memory to the non-RNG register, and the RNG generating random data based on the first value after the RNG copies the first value.

In another aspect, it is a feature of the present invention to provide a method for a microprocessor to enable multiple software applications to use a random number generator (RNG) in the microprocessor that is executing a multitasking operating system (OS) that does not provide for saving and restoring state of the RNG to memory during task switches. The method includes loading an RNG register and a non-RNG register with a first value in response to a first task executing a first instruction, and copying the first value from the non-RNG register to the RNG register in response to the first task executing a second instruction. The copying is performed after the OS has restored the first value from the memory to the non-RNG register. The method also includes generating random data based on the first value after the copy of the first value from the non-RNG register to the RNG register.

An advantage of the present invention is that it enables the high performance, truly random number generator (RNG) in the microprocessor to be shared by multiple tasks executing on the processor even though the operating system (OS) does not yet include task-switching support for the random number generator. This enables the feature to be used before OS support is provided, which increases the likelihood that application developers will develop applications to use the RNG, which increases the likelihood that the feature will become commercially desirable, which further motivates operating system developers to more quickly include multitasking support for the RNG in the operating system. The present invention advantageously provides the capability with little additional hardware requirement.

Other features and advantages of the present invention will become apparent upon study of the remaining portions of the specification and drawings.

DETAILED DESCRIPTION

Figure 1:
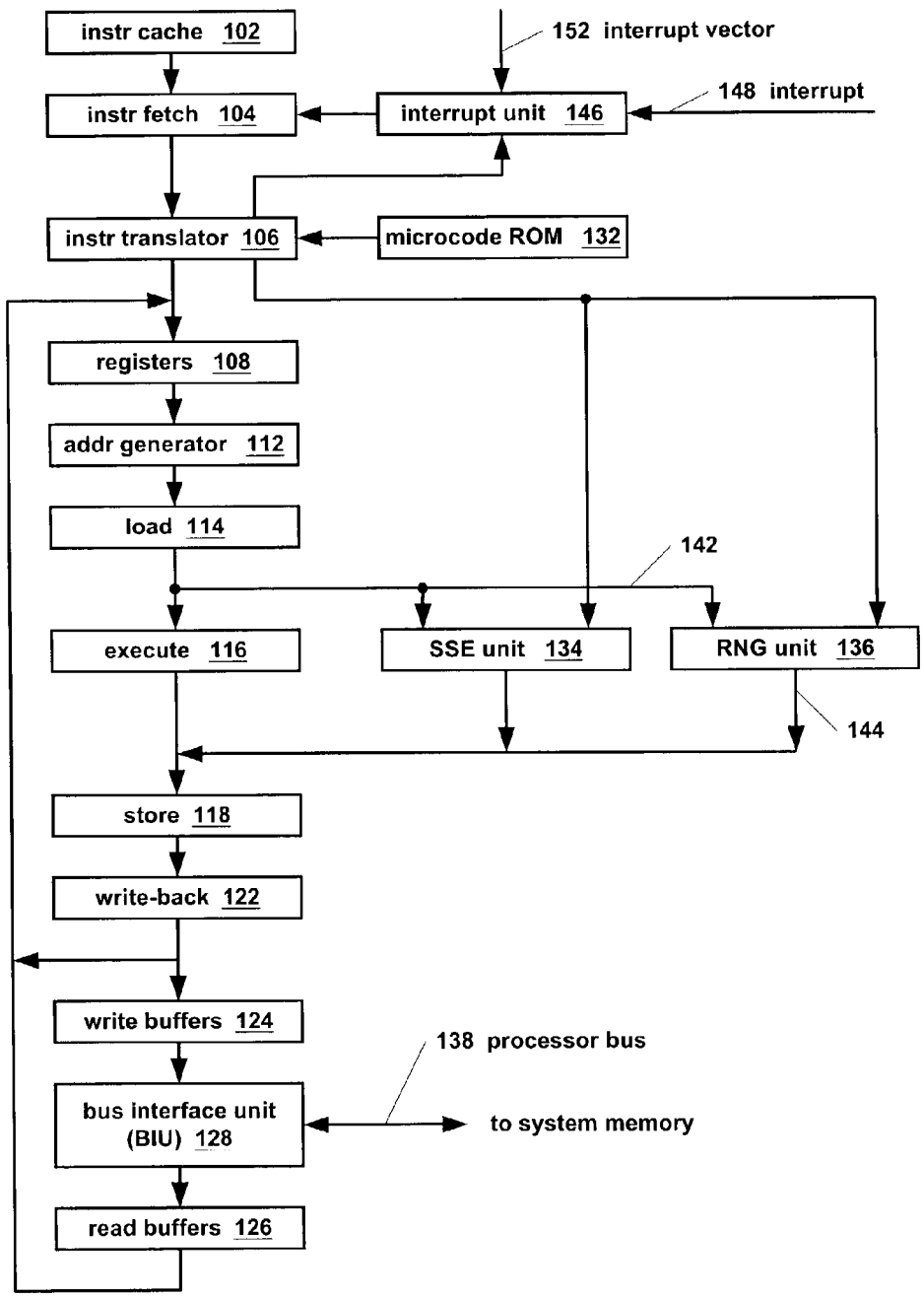
FIG. 1 is a block diagram illustrating a microprocessor according to the present invention.

Referring now to FIG. 1, a block diagram illustrating a microprocessor 100 according to the present invention is shown. Microprocessor 100 of FIG. 1 is a pipelined microprocessor comprising multiple stages, each of which performs a portion of the execution of program instructions as described below.

Microprocessor 100 includes a random number generator (RNG) unit 136. Microprocessor 100 executes operating systems and application programs that may require a supply of random numbers for various functions such as data encryption, simulations of physical phenomena, statistical analysis, or numerical analysis, among others. RNG unit 136 generates random numbers for these uses. RNG unit 136 will be described in more detail below.

Microprocessor 100 also includes an instruction cache 102. Instruction cache 102 caches program instructions fetched from a system memory coupled to microprocessor 100.

Microprocessor 100 also includes an instruction fetcher 104 coupled to instruction cache 102. Instruction fetcher 104 controls the fetching of the instructions from the system memory and/or instruction cache 102. Instruction fetcher 104 selects a value for an instruction pointer maintained by microprocessor 100. The instruction pointer specifies the next memory address from which to fetch instructions. Normally the instruction pointer is sequentially incremented to the next instruction. However, control flow instructions, such as branches, jumps, subroutine calls and returns, may cause the instruction pointer to be updated to a non-sequential memory address specified by the control flow instruction. In addition, interrupts may cause the instruction fetcher 104 to update the instruction pointer to a non-sequential address.

Microprocessor 100 also includes an interrupt unit 146 coupled to instruction fetcher 104. Interrupt unit 146 receives an interrupt signal 148 and an interrupt vector 152.

An entity external to microprocessor 100 may assert the interrupt signal 148 and provide an interrupt vector 152 to cause microprocessor 100 to execute an interrupt service routine. Interrupt unit 146 determines the memory address of an interrupt service routine based on the interrupt vector 152 and provides the interrupt service routine memory address to instruction fetcher 104, which updates the instruction pointer to the interrupt service routine address. Interrupt unit 146 also selectively disables and enables interrupt servicing depending upon the particular instructions being executed by microprocessor 100. That is, if interrupts are disabled, then the instruction pointer will not be changed even though interrupt line 148 is asserted until interrupts are enabled.

Microprocessor 100 also includes an instruction translator 106 coupled to instruction fetcher 104, interrupt unit 146, and RNG unit 136. Instruction translator 106 translates instructions received from instruction cache 102 and/or system memory. Instruction translator 106 translates the instructions and takes appropriate actions based on the type of instruction translated. Instruction translator 106 translates instructions defined in the instruction set of microprocessor 100. Instruction translator 106 generates an illegal instruction exception if it translates an instruction that is not defined in the instruction set of microprocessor 100.

In one embodiment, the instruction set of microprocessor 100 is substantially similar to the instruction set of an Intel® Pentium III® or Pentium IV® microprocessor. However, advantageously microprocessor 100 of the present invention includes additional instructions relating to the generation of random numbers by RNG unit 136. One additional instruction is an XSTORE instruction that stores random numbers generated by RNG unit 136. Another additional instruction is an XLOAD instruction that loads control values from system memory into a control and status register (CSR) 226 in RNG unit 136 and into a Streaming SIMD Extensions (SSE) register XMM0 372, which are described below with respect to FIGS. 2 and 3. The XSTORE and XLOAD instructions are described in more detail below.

Additionally, instruction translator 106 provides information about translated instructions to interrupt unit 146 to enable interrupt unit 146 to appropriately enable and disable interrupts. Furthermore, instruction translator 106 provides information about translated instructions to RNG unit 136. For example, instruction translator 106 provides information to RNG unit 136 about translated XSTORE and XLOAD instructions. In addition, instruction translator 106 informs RNG unit 136 when an instruction is translated that loads values into SSE register XMM0 372, in response to which RNG unit 136 takes certain actions, such as setting a flag to indicate the possible occurrence of a task switch by the operating system, as described below.

In one embodiment, instruction translator 106 translates a macroinstruction, such as a Pentium III or IV instruction, into one or more microinstructions that are executed by the microprocessor 100 pipeline.

Microprocessor 100 also includes a microcode ROM 132 coupled to instruction translator 106. Microcode ROM 132 stores microcode instructions for provision to instruction translator 106 to be executed by microprocessor 100. Some of the instructions in the instruction set of microprocessor 100 are implemented in microcode. That is, when instruction translator 106 translates one of these instructions, instruction translator 106 causes a routine of microinstructions within microcode ROM 132 to be executed to perform the translated macroinstruction. In one embodiment, the XSTORE and/or XLOAD instructions are implemented in microcode.

Additionally, in one embodiment, the XSTORE and XLOAD instructions are atomic because they are uninterruptible. That is, interrupts are disabled during the execution of XSTORE and XLOAD instructions.

Figure 3:
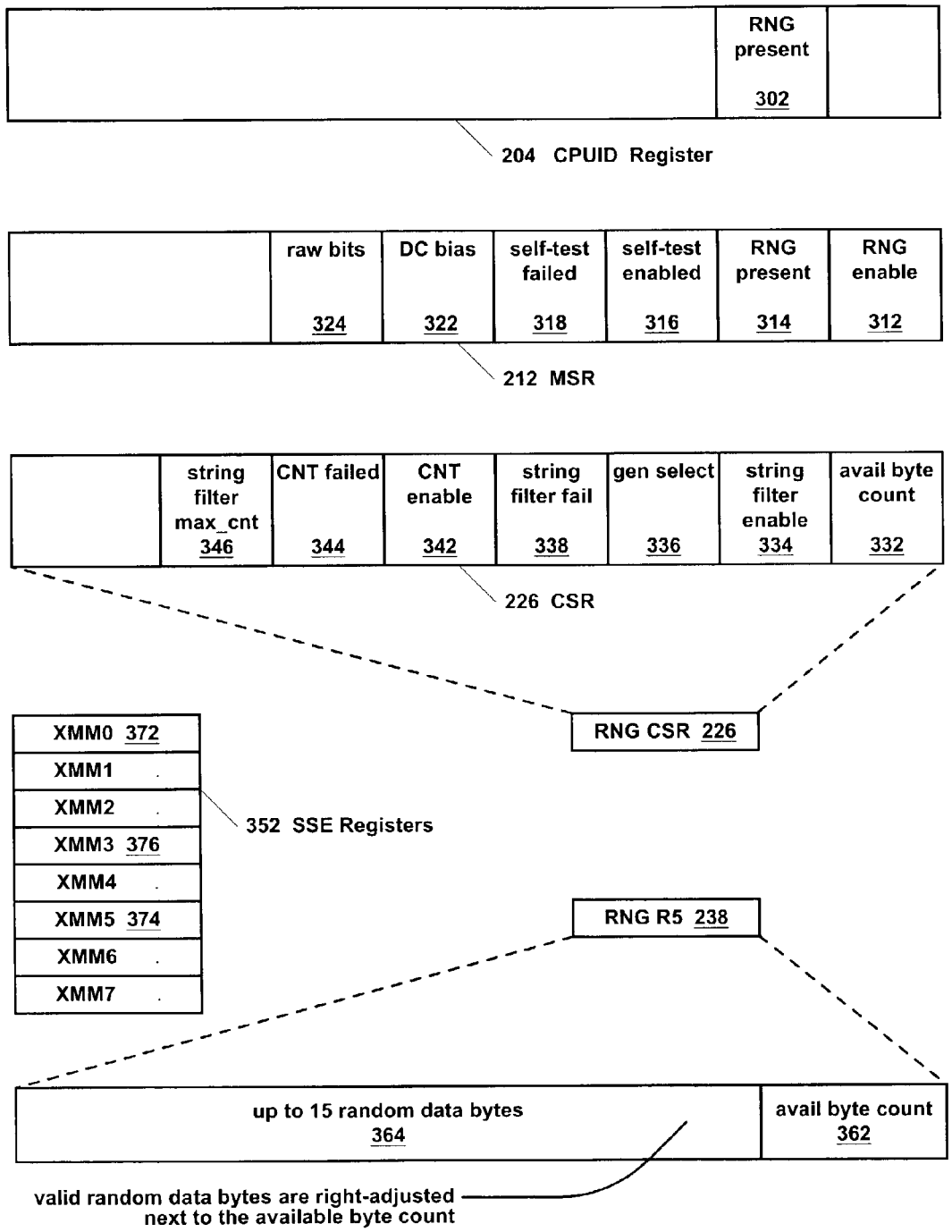
FIG. 3 is a block diagram illustrating various registers in the microprocessor of FIG. 1 related to the RNG unit of FIG. 1 according to the present invention.

Microprocessor 100 also includes a register file 108 coupled to instruction translator 106. Register file 108 includes the user-visible registers of microprocessor 100, among others. In one embodiment, the user-visible registers of register file 108 include the user-visible register set of a Pentium III or IV. SSE registers 352 of FIG. 3 are included in register file 108. SSE registers 352 are used by an SSE unit 134 included in microprocessor 100 and by RNG unit 136, as described below. In particular, register file 108 includes registers that are known to contemporary operating systems. Consequently, when an operating system switches from a first task to a second task, the operating system saves to system memory the registers in register file 108, including SSE registers 352, for the first task and restores from system memory the registers in register file 108, including SSE registers 352, for the second task.

Microprocessor 100 also includes an address generator 112 coupled to register file 108. Address generator 112 generates memory addresses based on operands stored in register file 108 and based on operands supplied by the instructions translated by instruction translator 106. In particular, address generator 112 generates a memory address specifying the location in system memory to which an XSTORE instruction stores bytes of random data. Additionally, address generator 112 generates a memory address specifying the location in system memory from which an XLOAD instruction loads control values for storage in CSR 226 of FIG. 2 via a data bus 142.

Microprocessor 100 also includes a load unit 114 coupled to address generator 112. Load unit 114 loads data from the system memory into microprocessor 100. Load unit 114 also includes a data cache that caches data read from the system memory. Load unit 114 loads data for provision to execution units in microprocessor 100, such as SSE unit 134, RNG unit 136 and execution units included in execute stage 116, on data bus 142. In particular, load unit 114 loads control values from system memory for storage in CSR 226 of FIG. 2 to execute an XLOAD instruction.

Microprocessor 100 also includes execute stage 116 coupled to load unit 114 via data bus 142. Execute stage 116 includes execution units such as arithmetic logic units for performing arithmetical and logical operations, such as adds, subtracts, multiplies, divides, and Boolean operations. In one embodiment, execute stage 116 includes an integer unit for performing integer operations and a floating-point unit for performing floating-point operations.

Microprocessor 100 also includes SSE unit 134 coupled to load unit 114 and instruction translator 106. SSE unit 134 includes arithmetic and logic units for executing SSE instructions, such as those included in the Pentium III and IV SSE or SSE2 instruction set. In one embodiment, although SSE registers 352 of FIG. 3 are included conceptually in register file 108, they are physically located in SSE unit 134 for storing operands used by SSE unit 134.

Microprocessor 100 also includes RNG unit 136 coupled to instruction translator 106 and to load unit 114 via data bus 142. RNG unit 136 provides on a data bus 144 the random data bytes and a count specifying the number of random data bytes provided for an XSTORE instruction. RNG unit 136 will be described in more detail below with respect to the remaining Figures.

Microprocessor 100 also includes a store unit 118 coupled to execute unit 116, SSE unit 134, and RNG unit 136. Store unit 118 stores data to the system memory and the data cache of load unit 114. Store unit 118 stores results generated by execute unit 116, SSE unit 134, and RNG unit 136 to system memory. In particular, store unit 118 stores XSTORE instruction count and random data bytes provided on data bus 144 by RNG unit 136 to system memory.

Microprocessor 100 also includes a write-back unit 122 coupled to execute unit 116 and register file 108. Write-back unit 122 writes back instruction results to register file 108.

Microprocessor 100 also includes write buffers 124 coupled to write-back unit 122. Write buffers 124 hold data waiting to be written to system memory, such as XSTORE instruction count and data.

Microprocessor 100 also includes a bus interface unit (BIU) 128 coupled to write buffers 124. BIU 128 interfaces microprocessor 100 with a processor bus 138. Processor bus 138 couples microprocessor 100 to the system memory. BIU 128 performs bus transactions on processor bus 138 to transfer data between microprocessor 100 and system memory. In particular, BIU 128 performs one or more bus transactions on processor bus 138 to store XSTORE instruction count and data to system memory. Additionally, BIU 128 performs one or more bus transactions on processor bus 138 to load XLOAD instruction control values from system memory.

Microprocessor 100 also includes read buffers 126 coupled to BIU 128 and register file 108. Read buffers 126 hold data received from system memory by BIU 128 while waiting to be provided to load unit 114 or register file 108. In particular, read buffers 126 hold XLOAD instruction data received from system memory while waiting to be provided to load unit 114 and subsequently to RNG unit 136.

Figure 2:
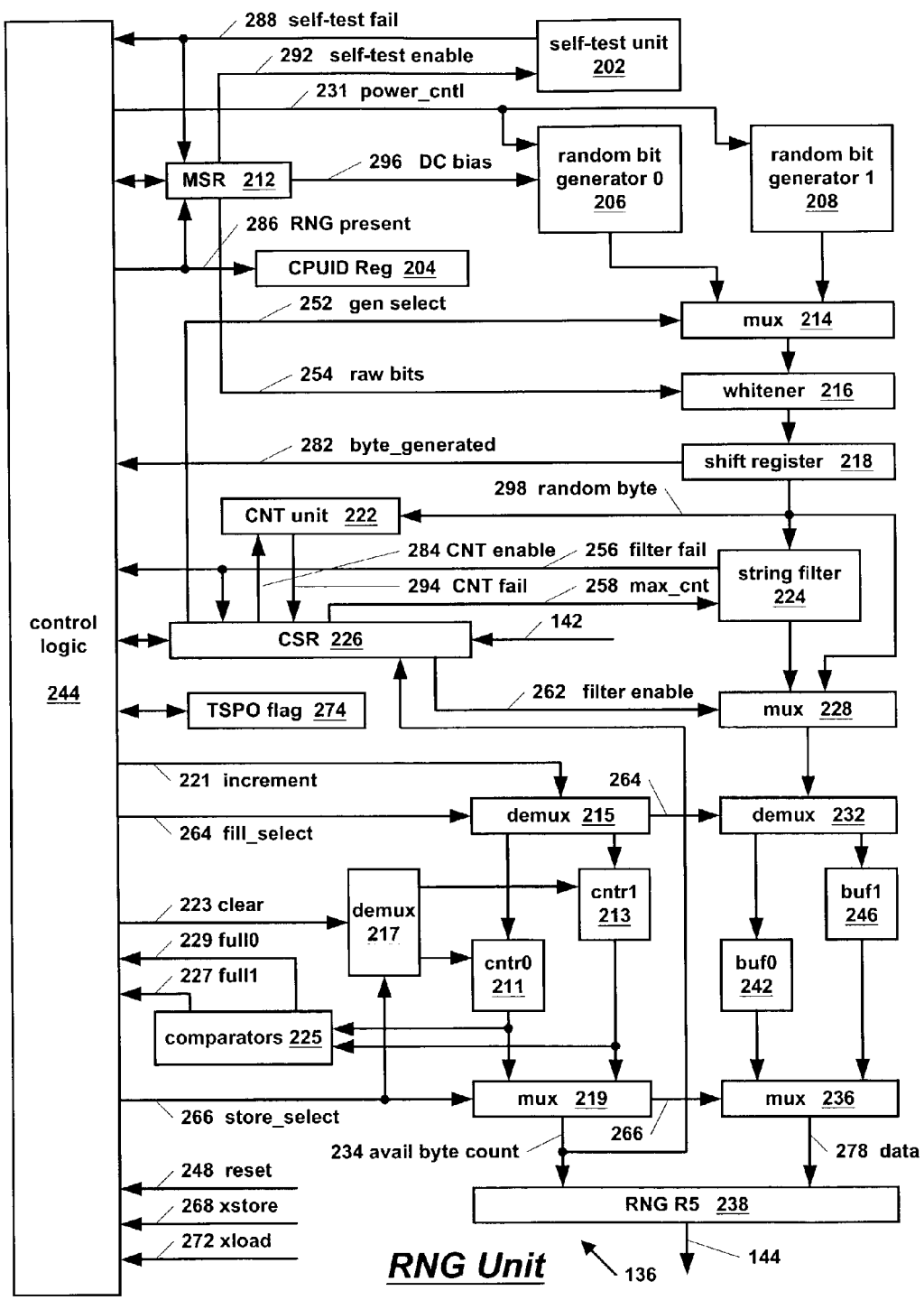
FIG. 2 is a block diagram illustrating the RNG unit of the microprocessor of FIG. 1 according to the present invention.

Referring now to FIG. 2, a block diagram illustrating RNG unit 136 of microprocessor 100 of FIG. 1 according to the present invention is shown.

RNG unit 136 includes control logic 244. Control logic 244 includes a large amount of combinatorial and sequential logic for controlling various elements of RNG unit 136. Control logic 244 receives an xload signal 272 and an xstore signal 268 that indicate an XLOAD or XSTORE instruction, respectively, is being executed. Control logic 244 also receives a reset signal 248 that indicates RNG unit 136 is being reset. Control logic 244 is described below in detail in connection with the remainder of RNG unit 136.

RNG unit 136 also includes a self-test unit 202 coupled to control logic 244. Self-test unit 202 receives a self-test enable signal 292 from a control and status register, referred to as machine specific register (MSR) 212, which is described in more detail with respect to FIG. 3 below. MSR 212 is also coupled to control logic 244. Self-test unit 202 provides a self-test fail signal 288 to control logic 244. Self-test unit 202 performs various self-tests of RNG unit 136 if enabled by self-test enable signal 292. If the self-tests fail, self-test unit 202 generates a true value on self-test fail signal 288, which is also provided to MSR 212. In one embodiment, self-test unit 202 performs statistical random number generator tests as defined by the Federal Information Processing Standards (FIPS) Publication 140-2 at pages 35–36, which are hereby incorporated by reference.

In one embodiment, self-test unit 202 performs the self-tests upon demand by a user. In one embodiment, self-test unit 202 performs the self-tests after a reset of microprocessor 100. If the self-tests fail, either on demand or on reset, self-test unit 202 generates a true value on self-test fail signal 288, which is reflected in a self-test failed bit 318 of FIG. 3 of MSR 212. Control logic 244 examines the self-test failed bit 318 on reset. If the self-test failed bit 318 is true, then control logic 244 asserts a false value on an RNG present signal 286 that is provided to MSR 212 for updating an RNG present bit 314 of FIG. 3.

RNG present signal 286 is also provided to a CPUID register 204 that includes an RNG present bit 302 of FIG. 3 that is also updated by RNG present signal 286. That is, RNG present bit 302 of CPUID register 204 is a copy of RNG present bit 314 of MSR 212. In one embodiment, an application program may read CPUID register 204 by executing a CPUID instruction in the IA-32 instruction set. If RNG present bit 302 is false, then microprocessor 100 indicates that RNG unit 136 is not present and the random number generation features of microprocessor 100 are not available. Advantageously, an application requiring random numbers may detect the absence of RNG unit 136 in microprocessor 100 via RNG present bit 302 and choose to obtain random numbers by another, perhaps lower performance, source if the RNG unit 136 is not present.

RNG unit 136 also includes two random bit generators, denoted random bit generator 0 206 and random bit generator 1 208, coupled to control logic 244. Each of the random bit generators 206 and 208 generate a stream of random bits that are accumulated by RNG unit 136 into bytes of random data. Each of the random bit generators 206 and 208 receive a power_cntrl signal 231 that specifies whether to power down the random bit generators 206 and 208. In one embodiment, powering down the random bit generators 206 and 208 comprises not providing a clock signal to them. The random bit generators 206 and 208 each generate a series of random data bits based on random electrical characteristics of microprocessor 100, such as thermal noise.

Random bit generator 0 206 receives a DC bias signal 296 from MSR 212. DC bias signal 296 conveys a value stored in DC bias bits 322 of FIG. 3 of MSR 212. The DC bias signal 296 value specifies a direct current bias voltage for partially controlling an operating voltage of free running ring oscillators in random bit generator 0 206.

Random bit generator 0 206 is described in detail in pending U.S. patent applications Ser. Nos. 10/046,055, 10/046,054, and 10/046,057 entitled APPARATUS FOR GENERATING RANDOM NUMBERS, OSCILLATOR BIAS VARIATION MECHANISM, and OSCILLATOR FREQUENCY VARIATION MECHANISM, respectively, which are hereby incorporated by reference in their entirety.

RNG unit 136 also includes a two-input mux 214 whose inputs are coupled to the outputs of random bit generators 206 and 208. Mux 214 selects one of the two inputs based on a control signal gen select 252 provided by CSR 226. The gen select signal 252 conveys a value stored in a gen select bit 336 of FIG. 3 in CSR 226.

RNG unit 136 also includes a von Neumann whitener, or compressor, 216 coupled to the output of mux 214. Whitener 216 is selectively enabled/disabled by a raw bits signal 254 received from MSR 212. The raw bits signal 254 conveys a value stored in raw bits field 324 of FIG. 3 of MSR 212. If raw bits signal 254 is true, then whitener 216 simply passes the bits received from mux 214 through to its output without performing the whitening function. Whitner 216 functions to significantly reduce residual bias that may exist in random bit generators 206 and 208 by receiving a pair of bits from mux 214 and outputting either one or none bits according to a predetermined input/output function. The input/output function of whitner 216 is described in Table 1 below.

TABLE 1

| Input | Output |
| --- | --- |
| 00 | nothing |
| 01 | 0 |
| 10 | 1 |
| 11 | nothing |

RNG unit 136 also includes an eight-bit shift register 218 coupled to whitener 216. Shift register 218 buffers random data bits received from whitener 216, accumulates the random data bits into eight-bit bytes, and outputs the accumulated random data bytes. Shift register 218 asserts a byte_generated signal 282 to control logic 244 to indicate that it has accumulated and output a random data byte 298.

RNG unit 136 also includes a continuous number test (CNT) unit 222 coupled to the output of shift register 218. CNT unit 222 receives random bytes 298 from shift register 218 and performs a continuous random number generator test on the random bytes 298. CNT unit 222 is selectively enabled/disabled by a CNT enable signal 284 received from CSR 226. CNT enable signal 284 conveys a value stored in a CNT enable bit 342 of FIG. 3 of CSR 226. If the continuous random number generator test fails, CNT unit 222 asserts a CNT fail signal 294 provided to CSR 226, which is stored in CNT failed bit 344 of FIG. 3 in CSR 226.

In one embodiment, the continuous random number generator test performed by CNT unit 222 substantially conforms to the continuous random number generator test described on page 37 in FIPS 140-2, which is hereby incorporated by reference. In one embodiment, CNT unit 222 performs the test by employing two eight-byte buffers, referred to as "old" and "new." After a reset, and after self-test if it is enabled, the first eight bytes delivered by shift register 218 are accumulated in buffer old. The next eight bytes are accumulated in buffer new. When an XSTORE instruction is executed, the eight bytes in buffer old are compared with the eight bytes in buffer new. If the bytes are not equal, then the test passes and the eight bytes in buffer new are moved to buffer old, and buffer new is cleared awaiting accumulation of eight more bytes. However, if the bytes are equal, CNT unit 222 asserts the CNT fail signal 294 to signify that the continuous random number generator test failed.

In one embodiment, XSTORE instructions will return an available byte count of zero as long as the CNT enable 342 and CNT failed 344 bits of FIG. 3 are set. In one embodiment, microprocessor 100 stores the available byte count and random data bytes to system memory on the particular XSTORE instruction execution that triggered the continuous random number generator test that failed.

In one embodiment, the continuous random number generator test is not performed across tasks that do not all have the test enabled. That is, the new and old buffers are updated and the continuous random number generator test is performed only for XSTORE instructions executed when the CNT enable bit 342 is set. Consequently, a given task is guaranteed to never receive two consecutive eight-byte values that are equal. However, if two tasks are running and one sets the CNT enable bit 342 and the other does not, then RNG unit 136 may XSTORE eight bytes to one task, a task switch occurs, and RNG unit 136 may XSTORE to the other task eight bytes equal to the previous eight bytes; however, the continuous random number generator test will not fail in this case.

RNG unit 136 also includes a string filter 224 coupled to the output of shift register 218. String filter 224 receives random bytes 298 from shift register 218 and selectively discards certain of the random bytes as described below, and outputs the non-discarded random bytes. String filter 224 ensures that no contiguous string of like bits, i.e., no contiguous string of zero bits or contiguous string of one bits, longer than a specified value is generated by RNG unit 136. The value is specified by a max_cnt signal 258 received from CSR 226. The max_cnt signal 258 conveys a value specified in string filter max_cnt field 346 of FIG. 3 in CSR 226. In one embodiment, the default value of max_cnt 346 is 26 bits. In one embodiment, the value of the string filter max_cnt field 346 must be at least 8. If string filter 224 detects a contiguous string of like bits exceeding max_cnt 258, then string filter 224 asserts a filter fail signal 256, which is stored in string filter fail bit 338 of FIG. 3 in CSR 226. String filter 224 is described in more detail below with respect to FIGS. 10 through 12.

RNG unit 136 also includes a second two-input mux 228. One of the inputs is coupled to the output of string filter 224, and the other input is coupled to the output of shift register 218. Mux 228 selects one of the inputs based on a filter enable signal 262 provided by CSR 226, which conveys the value stored in a string filter enable bit 334 of FIG. 3 of CSR 226.

RNG unit 136 also includes a one-input, two-output demultiplexer 232 whose input is coupled to the output of mux 228. A demultiplexer circuit includes a single data input and a plurality of data outputs. A demultiplexer also includes a control input. A demultiplexer selects one of the plurality of data outputs based on the control input and provides the data received on the data input to the selected output. Demux 232 selectively provides a random data byte received on its input to one of its outputs based on a fill_select signal 264 provided by control logic 244.

RNG unit 136 also includes two data buffers, denoted buf0 242 and buf1 246, coupled to the outputs of demux 232. Buf0 242 and buf1 246 accumulate random data bytes to be stored to system memory by XSTORE instructions. In one embodiment, buf0 242 and buf1 246 each are capable of storing up to 15 bytes of random data. In one embodiment, buf0 242 and buf1 246 each are capable of storing up to 16 bytes of random data.

RNG unit 136 also includes a third two-input mux 236 whose inputs are coupled to the outputs of buf0 242 and buf1 246. Mux 236 selects one of the sets of random data bytes on its inputs based on a store_select signal 266 provided by control logic 244 to output on a data bus 278.

RNG unit 136 also includes a TSPO flag register 274 coupled to control logic 244. TSPO flag register 274 stores a flag indicating whether a task switch by the operating system possibly occurred. Use of TSPO flag register 274 will be described below in more detail.

RNG unit 136 also includes a second two-output demux 215 coupled to control logic 244. The input of demux 215 is coupled to receive an increment signal 221 generated by control logic 244. Control logic 244 asserts increment signal 221 each time a random data byte is stored into buf0 242 or buf1 246. Demux 215 selectively provides increment signal 221 received on its input to one of its outputs based on fill_select signal 264.

RNG unit 136 also includes a third two-input demux 217 coupled to control logic 244. The input of demux 217 is coupled to receive a clear signal 223 generated by control logic 244. Control logic 244 asserts clear signal 223 each time an XSTORE instruction is executed such that the valid random data bytes are removed from buf0 242 or buf1 246. Demux 217 selectively provides clear signal 223 received on its input to one of its outputs based on store_select signal 266.

RNG unit 136 also includes two counters, denoted cntr0 211 and cntr1 213, coupled to demux 215 and demux 217. Cntr0 211 and cntr1 213 each have an increment, or count, input. The count inputs are coupled to the outputs of demux 215. Hence, when control logic 244 asserts increment signal 221, one of cntr0 211 and cntr1 213 specified by fill_select signal 264 is incremented. Cntr0 211 and cntr1 213 also each have a clear input. The clear inputs are coupled to the outputs of demux 217. Hence, when control logic 244 asserts clear signal 223, one of cntr0 211 and cntr1 213 specified by store_select signal 266 is cleared to zero.

RNG unit 136 also includes two comparators 225 coupled to the outputs of cntr0 211 and cntr1 213. Comparators 225 compare the counts output by cntr0 211 and cntr1 213 with the number of bytes cntr0 211 and cntr1 213 are capable of storing to determine whether cntr0 211 and cntr1 213 are full and generate a full0 signal 229 and full1 signal 227 to indicate the comparison results to control logic 244.

RNG unit 136 also includes a fourth two-input mux 219 whose inputs are coupled to the output of cntr0 211 and cntr1 213. Mux 219 selects one of the counts on its inputs based on store_select signal 266 to output as an available byte count 234. The available byte count 234 is also provided to CSR 226.

RNG unit 136 also includes a register denoted RNG R5 238, or R5 238. R5 238 has one input coupled to the output of mux 236 to receive data bytes 278. R5 238 has another input coupled to the output of mux 219 to receive available byte count 234. The output of R5 238 is coupled to data bus 144 of FIG. 1. R5 238 holds the count and data for an XSTORE instruction. In one embodiment, the count is stored in the least significant byte of R5 238 and the valid data bytes are stored in increasingly significant byte locations contiguous to the count. In one embodiment, R5 238 is capable of storing one count byte plus the number of random data bytes capable of being stored by buf0 242 and buf1 246.

In one embodiment, RNG unit 136 includes four buffers rather than two. Each of the buffers is capable of storing up to eight bytes of random data. In this embodiment, demux 215, 217, and 232 comprise four-output demuxes; mux 219 and 236 comprise four-input muxes; comparators 225 comprise four comparators that generate four full outputs; and fill_select signal 264 and store_select signal 266 comprise two bits for selecting one of the four counters and buffers.

Referring now to FIG. 3, a block diagram illustrating various registers in microprocessor 100 of FIG. 1 related to RNG unit 136 of FIG. 1 according to the present invention is shown.

FIG. 3 shows CPUTD register 204 of FIG. 2. CPUID register 204 includes an RNG present bit 302. RNG present bit 302 is a read-only feature-flags bit. If RNG present bit 302 is 1, then RNG unit 136 is present and enabled on microprocessor 100. If RNG present bit 302 is 0, then RNG unit 136 is not present, and the XLOAD and XSTORE instructions are invalid and if encountered by instruction translator 106 will cause an invalid instruction exception. Additionally, the bits in MSR 212 are undefined when read and have no effect when written. RNG present bit 302 is a copy of RNG present bit 314 of MSR 212.

FIG. 3 also shows MSR 212 of FIG. 2. MSR 212 includes an RNG enable bit 312. RNG enable bit 312 is writable. Writing RNG enable bit 312 to a 1 enables RNG unit 136. Writing RNG enable bit 312 to a 0 disables RNG unit 136. If RNG enable bit 312 is 0, then the XLOAD and XSTORE instructions are invalid and if encountered by instruction translator 106 will cause an invalid instruction exception. Additionally, the bits in MSR 212 are undefined when read and have no effect when written. The value of RNG enable bit 312 immediately after reset is 0.

MSR 212 also includes a read-only RNG present bit 314. RNG present bit 314 indicates whether RNG unit 136 exists on microprocessor 100. If RNG present bit 314 is 0, then RNG unit 136 cannot be enabled by setting RNG enable bit 312, and the bits in MSR 212 are undefined when read and have no effect when written. Additionally, RNG present bit 314 is cleared if the RNG unit 136 self-test fails, as described above with respect to FIG. 2.

MSR 212 also includes a read-only statistical self-test enabled bit 316. Self-test enabled bit 316 indicates whether the reset self-test described above with respect to FIG. 2 is currently enabled. If self-test enabled bit 316 is 0, then no self-test is performed after reset. If self-test enabled bit 316 is 1, then a self-test is performed after reset. In one embodiment, a self-test is performed after a warm reset as well as a power-up reset of microprocessor 100.

MSR 212 also includes a read-only statistical self-test failed bit 318. Self-test failed bit 318 indicates whether the last reset self-test described above with respect to FIG. 2 failed or not. In one embodiment, if self-test failed bit 318 is 1, then RNG unit 136 cannot be enabled.

MSR 212 also includes writable DC bias bits 322. In one embodiment, DC bias bits 322 comprise three bits. DC bias bits 322 control the DC bias supplied to random bit generator 0 206, which affects the speed and possible randomness of random bit generator 0 206. In one embodiment, if the statistical self-test is performed at reset, then the self-test unit 202 determines a correct or best value for DC bias bits 322 and sets them to the value. The value of DC bias bits 322 immediately after a reset is 000.

MSR 212 also includes writable raw bits bit 324. If the raw bits bit 324 is set to 0, then whitener 216 of FIG. 2 performs its whitening function described above with respect to FIG. 2 and delivers whitened bits to shift register 218. If the raw bits bit 324 is set to 1, then whitener 216 does not perform its whitening function and instead delivers the raw bits from mux 214 to shift register 218. The value of the raw bits bit 324 immediately after a reset is 0.

FIG. 3 also shows CSR 226 of FIG. 2. In one embodiment, CSR 226 is a 128-bit register. CSR 226 includes a read-only available byte count field 332. The available byte count field 332 specifies how many bytes of random data are currently available in buf0 242 or buf1 246 as selected by store_select signal 266 for storing via an XSTORE instruction. Software can read the available byte count field 332, if desired, in order to determine the number of random data bytes currently available for storing via an XSTORE instruction. Because RNG unit 136 synchronously accumulates bytes into buf0 242 and buf1 246, the actual number of bytes available to be stored by an XSTORE may be greater at the time the XSTORE is executed than the available byte count 332 previously read by an XLOAD. The value of the available byte count field 332 immediately after RNG unit 136 is enabled is 0.

CSR 226 also includes a writable string filter enable bit 334. If string filter enable bit 334 is 1, then string filter 224 is enabled; otherwise string filter 224 is disabled. The operation of string filter 224 is described below in more detail with respect to FIGS. 10 through 12. The value of the string filter enable bit 334 immediately after RNG unit 136 is enabled is 0.

CSR 226 also includes a writable gen select bit 336. If gen select bit 336 is set to 0, then random bit generator 0 206 is selected via mux 214 of FIG. 2 to provide the random bit stream for accumulation; otherwise, random bit generator 1 208 is selected. The value of the gen select bit 336 immediately after RNG unit 136 is enabled is 0.

CSR 226 also includes a string filter fail bit 338. String filter fail bit 338 is set to 1 to indicate that string filter 224 detected a contiguous string of like bits longer than a value specified in string filter max_cnt field 346 as described above with respect to FIGS. 2, and 10 through 12. Only RNG unit 136 can set the string filter fail bit 338 to 1. However, software may clear string filter fail bit 338 by writing a 0 to it. In one embodiment, filter fail bit 338 is set to 1 by a pulse on filter fail signal 256 and remains set to 1 until software clears it. The value of the string filter fail bit 338 immediately after RNG unit 136 is enabled is 0.

CSR 226 also includes a writable CNT enable bit 342. If the CNT enable bit 342 is 1, then CNT unit 222 performs its continuous random number generator tests as described above with respect to FIG. 2. The value of the CNT enable bit 342 immediately after RNG unit 136 is enabled is 0.

CSR 226 also includes a read-only CNT failed bit 344. RNG unit 136 sets CNT failed bit 344 to 1if the CNT enable bit 342 is 1and the continuous random number generator tests fail. In one embodiment, an XSTORE instruction executed while both the CNT enable bit 342 and the CNT failed bit 344 are 1results in the XSTORE storing an available byte count of 0and no data bytes to system memory. Hence, if a task sets the CNT enable bit 342 and a failure occurs while the task is executing, RNG unit 136 is effectively disabled for the task. However, RNG unit 136 is not disabled for other tasks not setting the CNT enable bit 342. The value of the CNT failed bit 344 immediately after RNG unit 136 is enabled is 0.

CSR 226 also includes a writable string filter max_cnt field 346. Software writes the string filter max_cnt field 346 to specify the maximum number of allowable contiguous like bits tolerable, as described with respect to FIGS. 10 through 12 below. In one embodiment, the string filter max_cnt field 346 comprises 5 bits. In one embodiment, the default value of string filter max_cnt field 346 is 26.

In one embodiment, various ones of the fields of MSR 212 are included in CSR 226 rather than MSR 212. Hence, the values in MSR 212 are saved and restored with CSR 226 to accommodate multitasking operation as described herein, and particularly with respect to FIGS. 4 through 9.

FIG. 3 also shows RNG R5 register 238 of FIG. 2. R5 238 comprises two fields: an available byte count field 362 and another field 364 for storing random data bytes, as described above. In one embodiment, the valid random data bytes are right adjusted next to the available byte count field 362.

FIG. 3 also shows SSE registers 352. SSE registers 352 comprise eight 128-bit registers denoted XMM0 through XMM7. XMM0 is designated XMM0 372, XMM3 is designated 376, and XMM5 is designated XMM5 374 in FIG. 3. In one embodiment, SSE registers 352 are substantially similar to SSE registers comprised in a Pentium III or IV as described on page 10-4 of IA-32® Intel Architecture Software Developer's Manual, Volume 1: Basic Architecture, 2002, which is hereby incorporated by reference. RNG CSR 226 shadows XMM0 372 and RNG R5 238 shadows XMM5 374 as described below.

In one embodiment, microprocessor 100 includes various fuses that may be temporarily or permanently set during the manufacturing process of microprocessor 100 to select values of various bits in the CSR 226 and MSR 212 at reset time in order to override the reset values described above.

Figure 4:
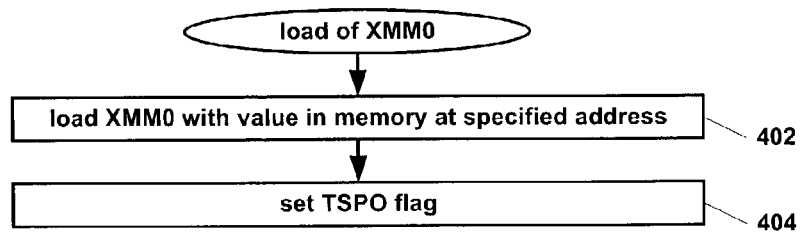
FIG. 4 is a flowchart illustrating operation of the microprocessor of FIG. 1 when executing an instruction that loads a value into the XMM0 register of FIG. 3 according to the present invention.

Referring now to FIG. 4, a flowchart illustrating operation of microprocessor 100 of FIG. 1 when executing an instruction that loads a value into XMM0 register 372 of FIG. 3 according to the present invention is shown. An instruction that loads XMM0 372 is an instruction executed by the microprocessor that loads the XMM0 register 372 with a value from system memory, such as a MOVAPS instruction. The MOVAPS instruction moves data from system memory to a specified XMM register, or vice versa, and is described on pages 3-443 through 3-444 of the IA-32® Intel Architecture Software Developer's Manual, Volume 2: Instruction Set Reference, 2001, which are hereby incorporated by reference. Examples of other instructions that load XMM0 372 from system memory are MOVAPD and MOVDQA. Because XMM0 372 is a register saved to memory and restored from memory by the operating system on a task switch, when a task switch occurs the operating system will execute an instruction such as a MOVAPS instruction to restore the switched-to task's previous value of XMM0 372 from memory. Flow begins at block 402.

At block 402, microprocessor 100 executes an instruction such as the MOVAPS instruction by fetching the value from the location in system memory specified by the instruction and loads the value into XMM0 372. Hence, any time XMM0 372 is loaded from memory, it is possible that a task switch has occurred. Flow proceeds to block 404.

At block 404, instruction translator 106 notifies RNG unit 136 that a MOVAPS instruction, or similar instruction that loads XMM0 372 from memory, has been translated. Once the value has been loaded into XMM0 372, control logic 244 of RNG unit 136 sets the TSPO flag 274 to indicate that a task switch possibly occurred. Flow ends at block 404.

Figure 5:
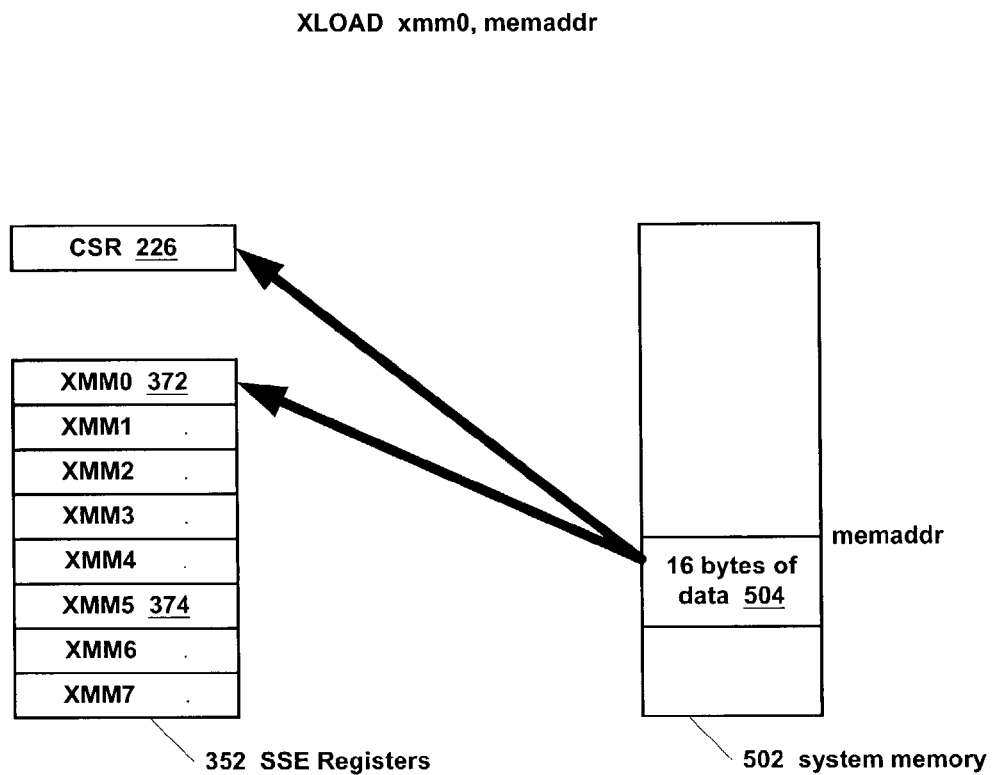
FIG. 5 is a block diagram illustrating operation of the microprocessor of FIG. 1 when executing an XLOAD instruction according to the present invention.

Referring now to FIG. 5, a block diagram illustrating operation of microprocessor 100 of FIG. 1 when executing an XLOAD instruction according to the present invention is shown. The XLOAD instruction is the means by which software loads a value into the CSR 226 of FIG. 2 to specify the control values under which RNG unit 136 will operate. A new instruction beyond the Pentium III or IV instruction set is required to load CSR 226 since CSR 226 does not exist in a Pentium ITT or IV. Advantageously, the XLOAD instruction also loads the control values into XMM0 372 to facilitate multitasking operation with RNG unit 136 as described herein.

FIG. 5 shows the format of an XLOAD instruction specifying XMM0 372, which is:

XLOAD XMM0, memaddr where memaddr specifies a memory address in system memory 502. The XLOAD instruction operates like the MOVAPS instruction except that CSR 226 is also loaded with the value from memory in addition to XMM0 372. In one embodiment, XLOAD moves 16 bytes of data 504 from memaddr into CSR 226 and also into XMM0 372, as shown. In one embodiment, the opcode value for the XLOAD instruction is 0x0F 0x5A followed by the standard mod R/M register and address format bytes specified by x86 instructions. In another embodiment, the opcode value for the XLOAD instruction is 0x0F 0xA6 0xC0. If an XLOAD instruction specifies one of the SSE registers 352 other than XMM0 372, then the specified SSE register 352 is loaded; however, CSR 226 is not loaded.

Figure 6:
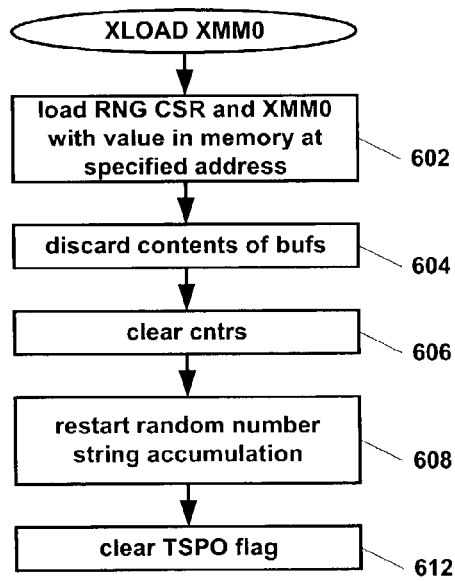
FIG. 6 is a flowchart illustrating operation of the microprocessor of FIG. 1 when executing an XLOAD instruction according to the present invention.

Referring now to FIG. 6, a flowchart illustrating operation of microprocessor 100 of FIG. 1 when executing an XLOAD instruction to XMM0 register 372 of FIG. 3 according to the present invention is shown. Flow begins at block 602.

At block 602, microprocessor 100 loads CSR 226 of FIG. 2 and XMM0 372 of FIG. 3 with the value in system memory 502 at the memory address specified by the XLOAD instruction as shown in FIG. 5. Flow proceeds to block 604.

At block 604, RNG unit 136 discards the contents of buf0 242 and buf1 246 in response to the loading of CSR 226 since the random data bytes accumulated in buf0 242 and buf1 246 may not have been generated with the control values in CSR 226 required by the new task that is now loading CSR 226. Flow proceeds to block 606.

At block 606, RNG unit 136 clears the available byte count to 0 in cntr0 211 and cntr1 213 since the random data bytes in buf0 242 and buf1 246 were discarded at block 604. Flow proceeds to block 608.

At block 608, RNG unit 136 restarts the random number accumulation. That is, the random bit generator 206 or 208 selected by gen select signal 252 generates random bits based on DC bias signal 296 in the case of random bit generator 0 206; whitener 216 selectively whitens the bits based on the raw bits signal 254; CNT unit 222 selectively performs continuous random number generator tests based on CNT enable signal 284; string filter 224 selectively filters the bytes accumulated by shift register 218 based on filter enable signal 262 and max_cnt signal 258; buf0 242 and buf1 246 accumulate the random data bytes based on fill_select signal 264; and cntr0 211 and cntr1 213 count the bytes accumulated in buf0 242 and buf1 246 based on fill_select signal 264. Flow proceeds to block 612.

At block 612, control logic 244 clears TSPO flag 274 since CSR 226 has been updated to the control values desired by the current task. Flow ends at block 612.

Figure 7:
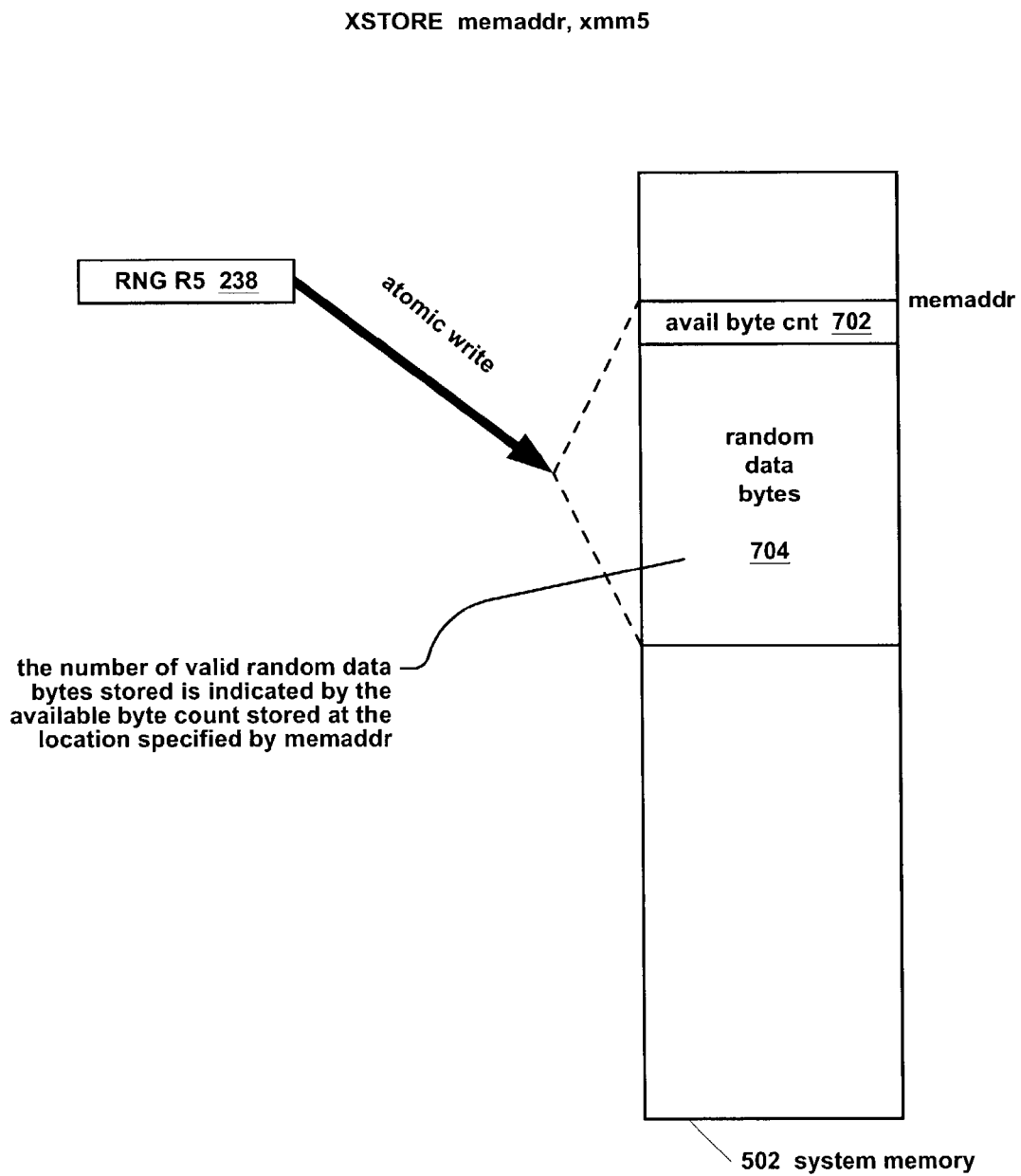
FIG. 7 is a block diagram illustrating operation of the microprocessor of FIG. 1 when executing an XSTORE instruction according to the present invention.

Referring now to FIG. 7, a block diagram illustrating operation of microprocessor 100 of FIG. 1 when executing an XSTORE instruction according to the present invention is shown. The XSTORE instruction is the means by which software stores the count of available random data bytes and the random data bytes themselves from R5 238 to system memory. A new instruction beyond the Pentium III or IV instruction set is required to store RNG R5 238 since it does not exist in a Pentium III or IV. Advantageously, the XSTORE instruction atomically writes the count and data bytes to memory to facilitate multitasking operation with RNG unit 136 as described herein. That is, the XSTORE instruction is not interruptible. Hence, when a task executes an XSTORE instruction, another task may not interrupt the XSTORE instruction to modify the available byte count or random data bytes that will be written to system memory by the XSTORE instruction. Hence, the XSTORE instruction advantageously inherently facilitates multitasking with respect to supplying a variable number of random data bytes by atomically writing both the data and count.

FIG. 7 shows the format of an XSTORE instruction, which is:

XSTORE memaddr, XMM5

Memaddr specifies a memory address in system memory 502. The XSTORE instruction operates like the MOVAPS instruction except that the specified XMM register is not stored to system memory; instead R5 238 is stored to system memory if XMM5 374 is specified. That is, R5 238 shadows XMM5 374. XSTORE moves the count specifying the available valid random data bytes 362 of FIG. 3 from R5 238 to a location 702 at memaddr in system memory 502, as shown. Additionally, XSTORE moves the valid random bytes of data 364 specified by the count 362 to a location 704 in system memory 502 immediately adjacent to the available byte count 702, as shown.

In one embodiment, the opcode value for the XSTORE instruction is 0x0F 0x5B followed by the standard mod R/M register and address format bytes specified by x86 instructions. In another embodiment, the opcode value for the XSTORE instruction is 0x0F 0xA7 0xC0. In one embodiment, the XSTORE instruction requires that the ES:EDI registers in register file 108 specify memaddr, i.e., point to the starting memory address where the count and random data bytes are to be stored. In one embodiment, the XSTORE does not allow segment overriding. If an XSTORE instruction specifies one of the SSE registers 352 other than XMM5 374, then the results are undefined.

In one embodiment, the number of random data bytes 704 that microprocessor 100 stores to system memory equals the available byte count 702 also written to system memory.

In another embodiment, the number of random data bytes 704 that microprocessor 100 stores to system memory is equal to one less than the size in bytes of RNG R5 238. That is, if RNG R5 238 is a 16-byte register capable of holding up to 15 random data bytes 364 and one byte of available byte count 362, then microprocessor 100 stores 16 bytes to system memory 502: 15 bytes of random data to the random data bytes 704 location and one count byte to the available byte count 702 location in system memory 502. However, some of the 15 bytes written to system memory 502 may not be valid. In one embodiment, the number of bytes written to memory is always a power of 2. Only the first N bytes are valid, where N is the available byte count 702.

In this embodiment, RNG unit 136 clears the buffer, i.e., buf0 242 or buf1 246 of FIG. 2, implicated by an XSTORE operation. By clearing the buffer, microprocessor 100 improves security by avoiding the problem of tasks being able to view one another's random data. For example, assume a first task performs a first XSTORE that stores 15 bytes of random data from buf0 242 to system memory and a second XSTORE that stores 15 bytes of random data from buf1 246 to system memory; then the operating system switches to a second task which immediately executes an XSTORE before RNG unit 136 has accumulated any more bytes of random data into buf0 242. If the RNG unit 136 did not clear buf0 242 after the first XSTORE, then the random data received by the first task would also be stored to the second task's memory location, thereby enabling the second task to view the first task's random data.

In one embodiment, the XSTORE instruction specifies a maximum number of random data bytes to store to system memory. In one embodiment, the maximum number of bytes is specified in one of the general-purpose registers of register file 108, such as ECX. In this embodiment, if more bytes are available in buf0 242 or buf1 246 selected by store_select 266 than the maximum number specified in ECX, then microprocessor 100 only stores the maximum number of bytes specified in ECX; otherwise, the XSTORE instruction stores the number of valid bytes available. In either case, the XSTORE instruction stores into the available byte count location 702 the number of valid random data bytes stored to the data byte location 704 in system memory 502.

In one embodiment, the XSTORE instruction specifies a required number of random data bytes to store to system memory. In this embodiment, the required number of bytes is specified in one of the general-purpose registers of register file 108, such as ECX. In this embodiment, the XSTORE instruction is prefixed with an x86 REP prefix. In this embodiment, the REP XSTORE instruction is not atomic.

That is, the REP XSTORE is interruptible since the number of random bytes required may be large. However, since the number of random data bytes stored is not variable, i.e., the software knows the number of random data bytes that are to be stored to memory, it is not necessary that the instruction be atomic.

Figure 8:
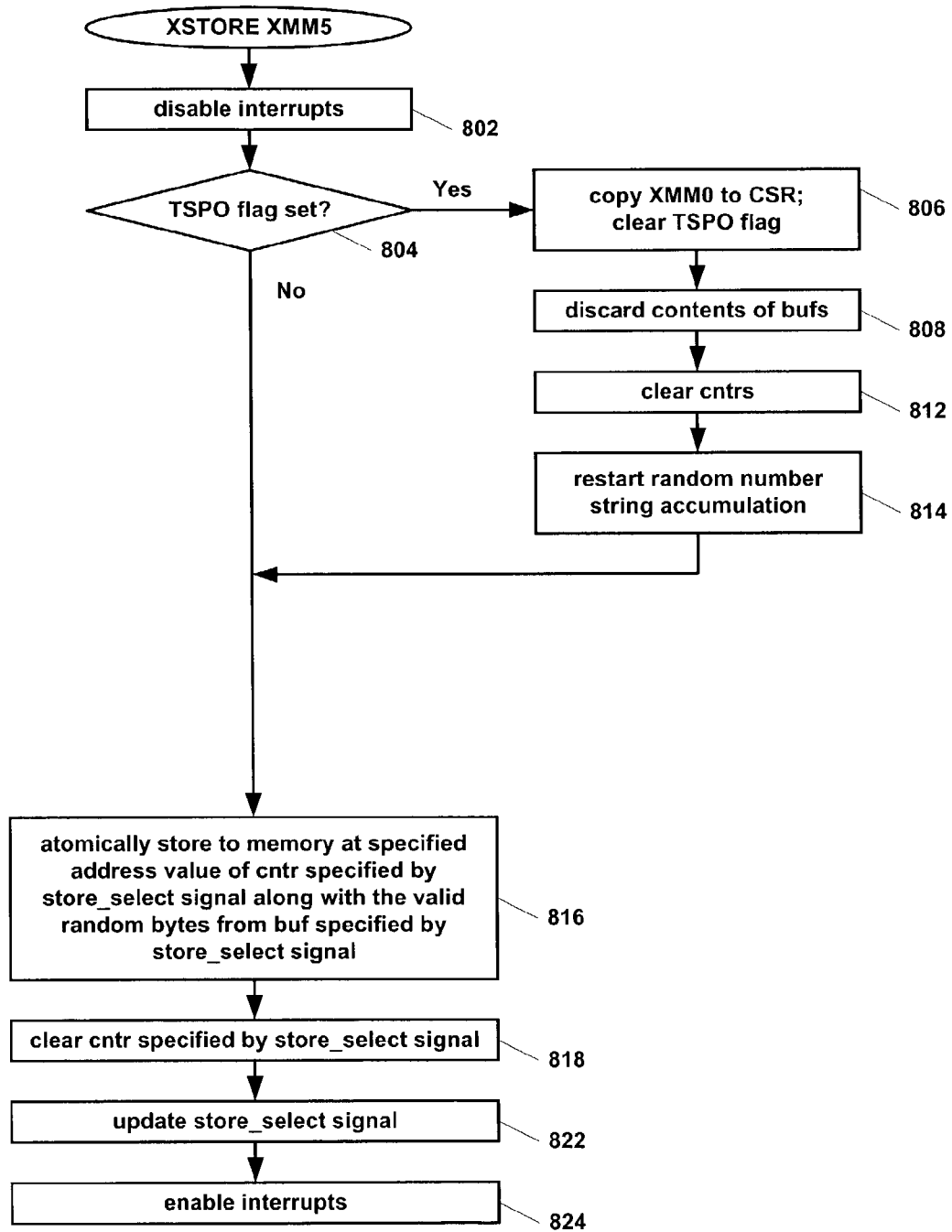
FIG. 8 is a flowchart illustrating operation of the microprocessor of FIG. 1 when executing an XSTORE instruction according to the present invention.

Referring now to FIG. 8, a flowchart illustrating operation of microprocessor 100 of FIG. 1 when executing an XSTORE instruction from XMM5 register of FIG. 3 according to the present invention is shown. Flow begins at block 802.

At block 802 interrupt unit 146 of FIG. 1 disables interrupts in response to instruction translator 106 of FIG. 1 notifying interrupt unit 146 that an XSTORE instruction was translated. Flow proceeds to decision block 804.

At decision block 804, control logic 244 of FIG. 2 examines TSPO flag 274 to determine whether the flag is set. If so flow proceeds to block 806. Otherwise, flow proceeds to block 816.

At block 806, RNG unit 136 copies the contents of XMM0 372 to CSR 226 and clears the TSPO flag 274. Since TSPO flag 274 indicates that a task switch may have possibly occurred since the last XSTORE or XLOAD, as indicated by a load from system memory of XMM0 372 according to step 402 of FIG. 4, the possibility exists that CSR 226 does not have the correct control values for the task currently executing the XSTORE instruction. Hence, the XSTORE instruction must update the CSR 226 with the correct control values. The correct values are stored in XMM0 372, since the correct control values were originally loaded into XMM0 372 and also into CSR 226 by an XLOAD executed when the task initialized and were restored to XMM0 372 by the operating system when it switched back to the current task. Flow proceeds to block 808.

At block 808, RNG unit 136 discards the contents of buf0 242 and buf1 246 in response to the loading of CSR 226 since the random data bytes accumulated in buf0 242 and buf1 246 may not have been generated with the control values in CSR 226 required by the new task for which new control values were copied into CSR 226 in block 806. Flow proceeds to block 812.

At block 812, RNG unit 136 clears the available byte count to 0 in cntr0 211 and cntr1 213 since the random data bytes in buf0 242 and buf1 246 were discarded at block 808. Flow proceeds to block 814.

At block 814, RNG unit 136 restarts the random number accumulation, as described above with respect to block 608 of FIG. 6. Flow proceeds to block 816.

At block 816, RNG unit 136 atomically stores R5 238 to system memory 502 at the memory address specified by the XSTORE instruction, which holds the value of cntr0 211 or cntr1 213 specified by store_select signal 266 along with the valid random data bytes from buf0 242 or buf1 246 specified by store_select signal 266, as shown in FIG. 7. Flow proceeds to block 818.

At block 818, control logic 244 asserts clear signal 223 to clear cntr0 211 or cntr1 213 specified by store_select signal 266 since the valid random data bytes have been consumed by the store to memory at block 816. Flow proceeds to block 822.

At block 822, control logic 244 updates store_select signal 266. That is, if store_select signal 266 was 0, then control logic 244 updates store_select signal 266 to 1. Conversely, if store_select signal 266 was 1, then control logic 244 updates store_select signal 266 to 0. Flow proceeds to block 824.

At block 824, interrupt unit 146 enables interrupts since the XSTORE instruction has completed execution. Flow ends at block 824.

Figure 9:
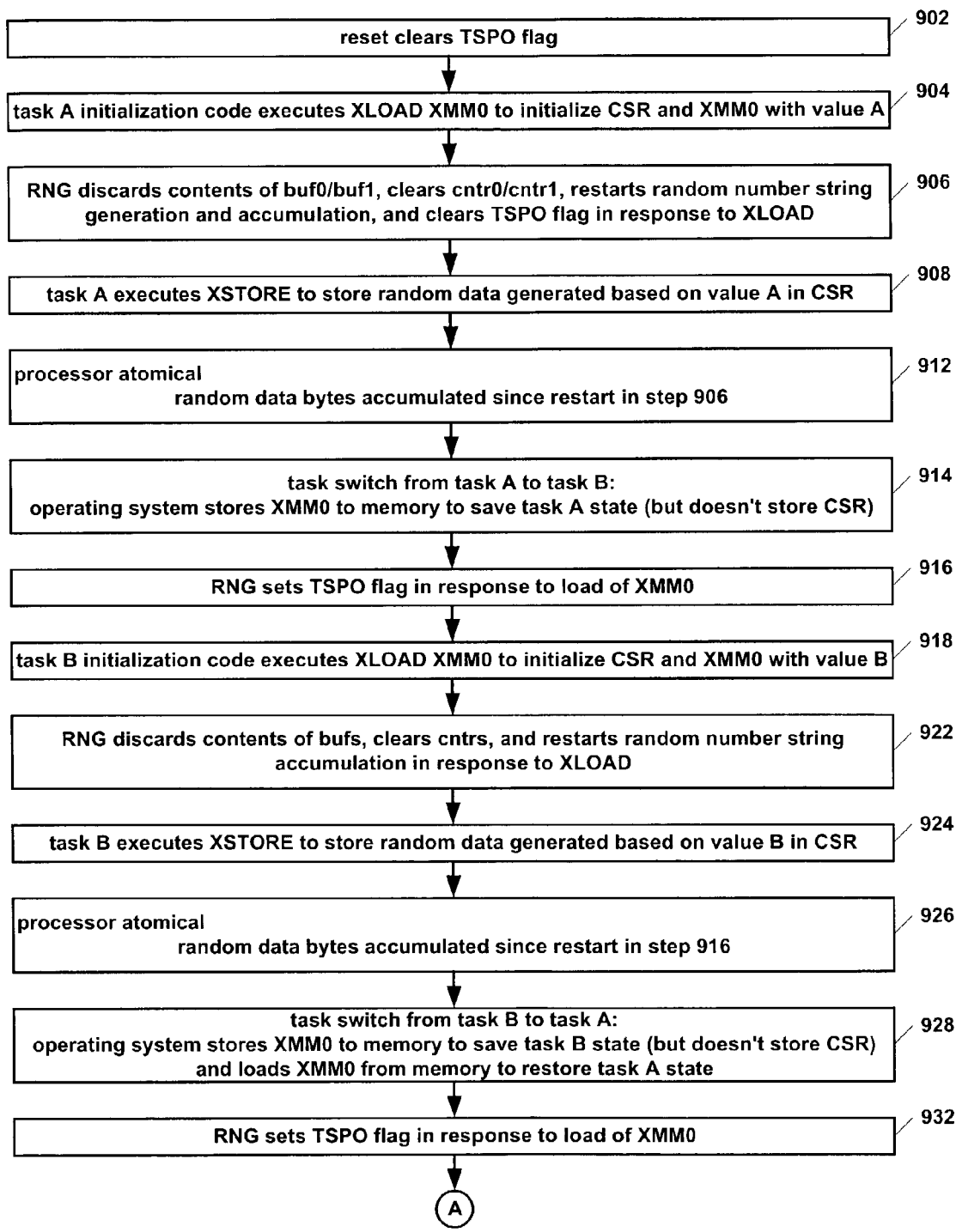
FIG. 9 is a flowchart illustrating an example of multitasking operation of the microprocessor of FIG. 1 with respect to random number generation according to the present invention.
Figure 9:
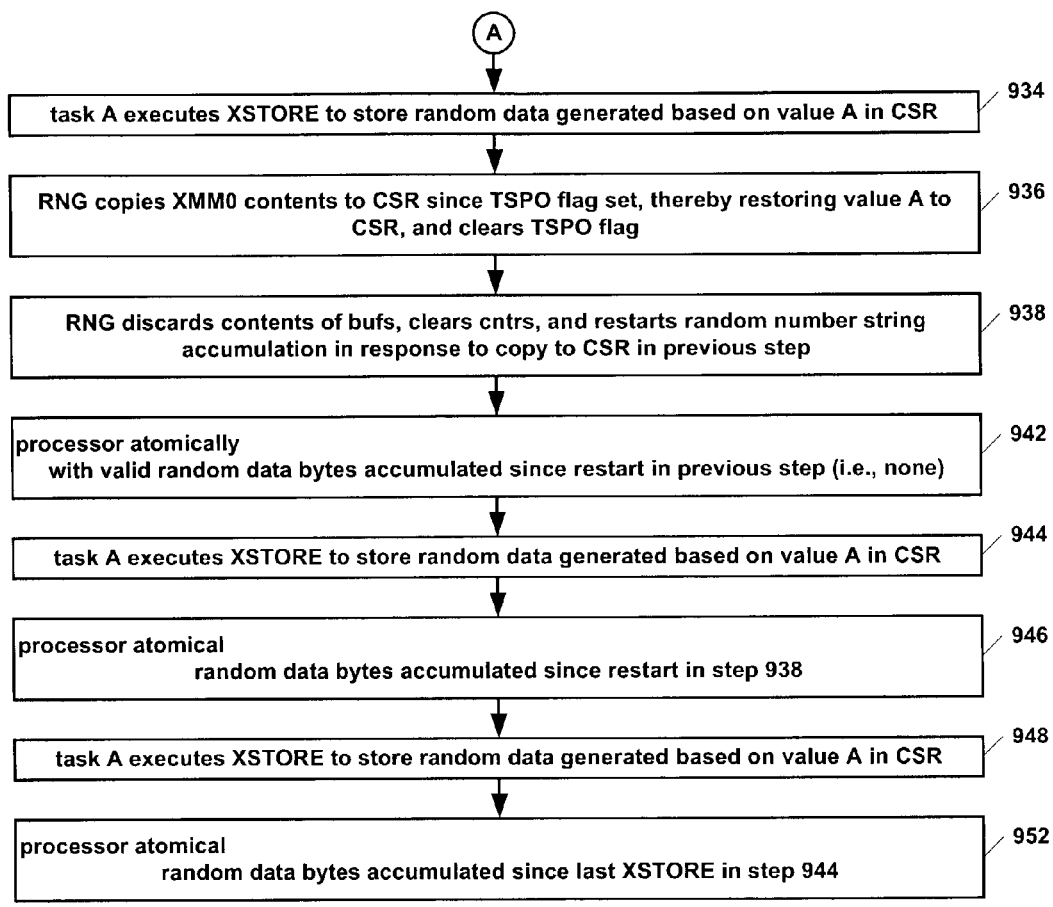

Referring now to FIG. 9, a flowchart illustrating an example of multi-tasking operation of microprocessor 100 of FIG. 1 with respect to random number generation according to the present invention is shown. The flowchart of FIG. 9 illustrates a typical scenario in which two tasks each initialize RNG unit 136 and execute XSTORE instructions to store random data bytes to memory. FIG. 9 illustrates how the present invention advantageously supports multitasking between the two tasks, task A and task B, even though the operating system does not include support for saving and restoring the state of RNG unit 136, namely CSR 226. Flow begins at block 902.

At block 902, a reset occurs, which causes control logic 244 to clear TSPO flag 274. Flow proceeds to block 904.

At block 904, the operating system starts up task A, and task A's initialization code executes an XLOAD instruction to XMM0 372 to initialize CSR 226 and XMM0 372 with the desired control values denoted value A. Flow proceeds to block 906.

At block 906, RNG unit 136 discards the contents of buf0 242 and buf1 246, clears cntr0 211 and cntr1 213, restarts random number generation and accumulation, and clears TSPO flag 274 in response to the XLOAD, according to blocks 604, 606, 608, and 612 of FIG. 6. Flow proceeds to block 908.

At block 908, task A executes an XSTORE instruction to store random data generated based on control value A loaded into CSR 226 at block 904. Flow proceeds to block 912.

At block 912, to execute the XSTORE of the previous block, RNG unit 136 atomically stores the count and data to system memory accumulated since the restart at block 906, as shown in FIG. 7 and described in FIG. 8. Flow proceeds to block 914.

At block 914, the operating system performs a task switch from task A to task B. Among other things, the operating system stores the value of XMM0 372, which contains control value A, to system memory to save the state of task A. However, the operating system does not store CSR 226 to memory to save its state because the operating system does not know about CSR 226. Flow proceeds to block 916.

At block 916, RNG unit 136 sets TSPO flag 274 in response to the load of XMM0 372 at block 914, according to step 404 of FIG. 4. Flow proceeds to block 918.

At block 918, the operating system starts up task B, and task B's initialization code executes an XLOAD instruction to XMM0 372 to initialize CSR 226 and XMM0 372 with the desired control values denoted value B. Flow proceeds to block 922.

At block 922, RNG unit 136 discards the contents of buf0 242 and buf1 246, clears cntr0 211 and cntr1 213, restarts random number generation and accumulation, and clears TSPO flag 274 in response to the XLOAD, according to blocks 604, 606, 608, 612 of FIG. 6. Flow proceeds to block 924.

At block 924, task B executes an XSTORE instruction to store random data generated based on control value B loaded into CSR 226 at block 918. Flow proceeds to block 924.

At block 926, to execute the XSTORE of the previous block, RNG unit 136 atomically stores the count and data to system memory accumulated since the restart at block 922, as shown in FIG. 7 and described in FIG. 8. Flow proceeds to block 928.

At block 928, the operating system performs a task switch from task B to task A. Among other things, the operating system stores the value of XMM0 372, which contains control value B, to system memory to save the state of task B. However, the operating system does not store CSR 226 to memory to save its state because the operating system does not know about CSR 226. Additionally, the operating system restores the state of task A, which includes loading into XMM0 372 value A from system memory previously saved at block 914. Flow proceeds to block 932.

At block 932, RNG unit 136 sets TSPO flag 274 in response to the load of XMM0 372 at block 928, according to step 404 of FIG. 4. Flow proceeds to block 934.

At block 934, task A executes an XSTORE instruction to store random data generated based on control value A loaded into CSR 226 at block 904. However, value A was overwritten in CSR 226 at block 918. Hence, the random data bytes currently accumulated in buf0 242 and buf1 246 were not generated based on value A, but instead were generated based on value B. Flow proceeds to block 936.

At block 936, RNG unit 136 determines that TSPO flag 274 is set according to block 804 of FIG. 8, and consequently copies the contents of XMM0 372 to CSR 226, thereby restoring value A to CSR 226, according to block 806 of FIG. 8. In addition, RNG unit 136 clears TSPO flag 274, according to block 806, since CSR 226 has been restored. Flow proceeds to block 938.

At block 938, RNG unit 136 discards the contents of buf0 242 and buf1 246, clears cntr0 211 and cntr1 213, and restarts random number generation and accumulation, in response to the copy into CSR 226 at block 936, according to blocks 808, 812, and 814 of FIG. 8. Flow proceeds to block 942.

At block 942, to execute the XSTORE of block 934, RNG unit 136 atomically stores the count and data to system memory accumulated since the restart at the previous block, as shown in FIG. 7 and described in FIG. 8. In this case, the count is 0and no valid random data bytes are stored to system memory since cntr0 211 and cntr1 213 were cleared and the contents of buf0 242 and buf1 246 were discarded at the previous block. Flow proceeds to block 944.

At block 944, task A executes an XSTORE instruction to store random data generated based on control value A loaded into CSR 226 at block 904, which was restored to value A at block 936. Flow proceeds to block 946.

At block 946, to execute the XSTORE of the previous block, RNG unit 136 atomically stores the count and data to system memory accumulated since the restart at block 938, as shown in FIG. 7 and described in FIG. 8. Flow proceeds to block 948.

At block 948, task A executes an XSTORE instruction to store random data generated based on control value A loaded into CSR 226 at block 904, which was restored to value A at block 936. Flow proceeds to block 952.

At block 952, to execute the XSTORE of the previous block, RNG unit 136 atomically stores the count and data to system memory accumulated since the restart at block 938, less the bytes stored by the last XSTORE, which was at block 946, as shown in FIG. 7 and described in FIG. 8. Flow ends at block 952.

Figure 10:
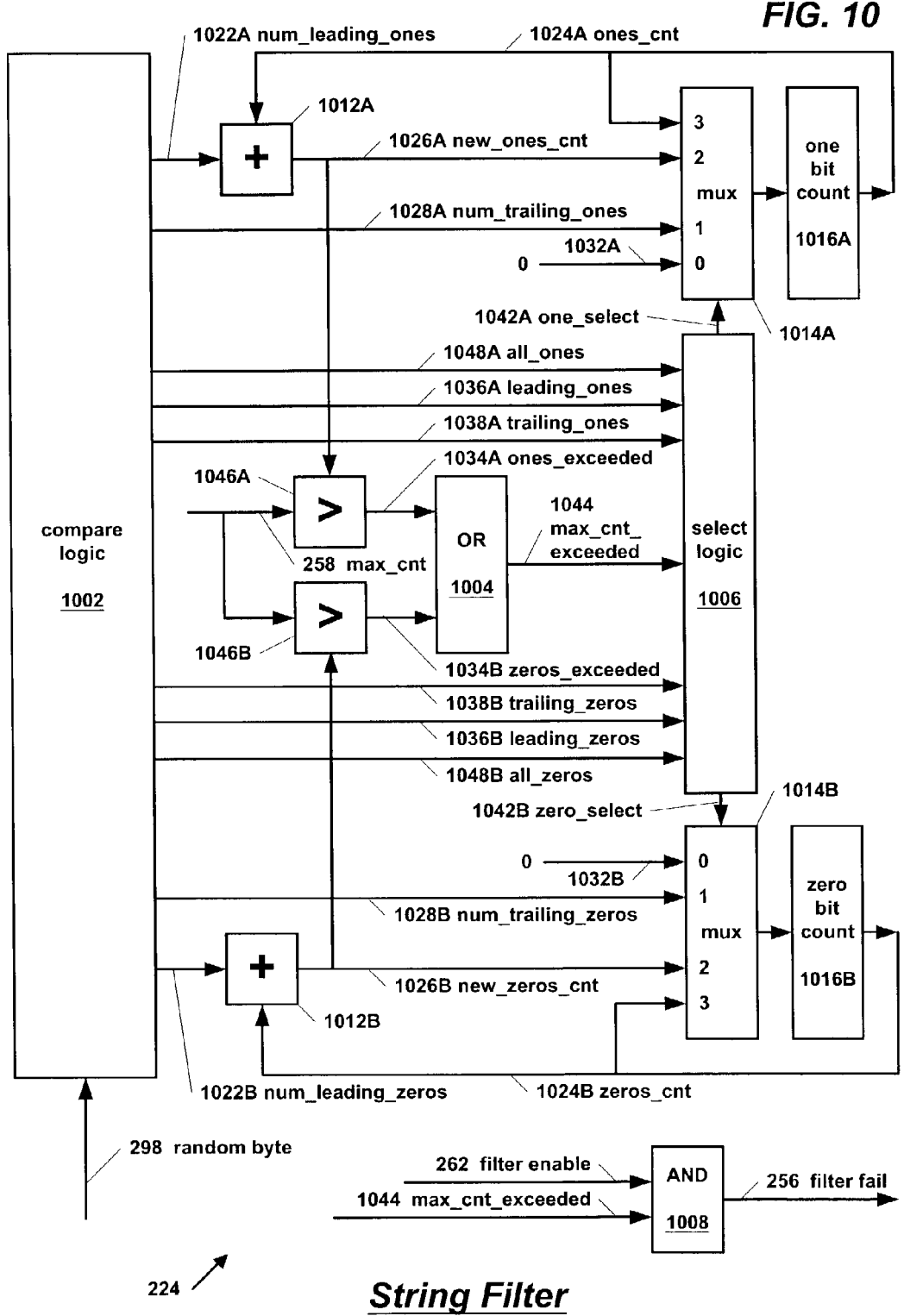
FIG. 10 is a block diagram illustrating the string filter of the RNG unit of FIG. 2 of the microprocessor of FIG. 1 according to the present invention.

Referring now to FIG. 10, a block diagram illustrating string filter 224 of RNG unit 136 of FIG. 2 of microprocessor 100 of FIG. 1 according to the present invention is shown.

For the purposes of the present disclosure, leading one bits are defined as the contiguous one bits at the beginning of a byte. A byte may contain between zero and eight, inclusive, leading one bits. For example, the byte 00011111 has five leading one bits; the byte 11111110 has zero leading one bits; and the byte 11111111 has eight leading one bits.

For the purposes of the present disclosure, leading zero bits are defined as the contiguous zero bits at the beginning of a byte. A byte may contain between zero and eight, inclusive, leading zero bits. For example, the byte 11100000 has five leading zero bits; the byte 00000001 has zero leading zero bits; and the byte 00000000 has eight leading zero bits.

For the purposes of the present disclosure, trailing one bits are defined as the contiguous one bits at the end of a byte; however a byte that is all ones is defined as having no trailing one bits. A byte may contain between zero and seven, inclusive, trailing one bits. For example, the byte 11110000 has four trailing one bits; the byte 11111110 has seven trailing one bits; the byte 01111111 has zero trailing one bits; and the byte 11111111 has zero trailing one bits.

For the purposes of the present disclosure, trailing zero bits are defined as the contiguous zero bits at the end of a byte; however a byte that is all zeros is defined as having no trailing zero bits. A byte may contain between zero and seven, inclusive, trailing zero bits. For example, the byte 00001111 has four trailing zero bits; the byte 00000001 has seven trailing zero bits; the byte 10000000 has zero trailing zero bits; and the byte 0000000 has zero trailing zero bits.

String filter 224 includes compare logic 1002. Compare logic 1002 receives random data byte 298 from shift register 218 of FIG. 2. Compare logic 1002 examines the bits in the random data byte 298 and generates various signals used to detect contiguous strings of ones and zeros as now described.

Compare logic 1002 generates a num_leading_ones signal 1022A that specifies the number of leading one bits in random data byte 298.

Compare logic 1002 generates a num_trailing_ones signal 1028A that specifies the number of trailing one bits in random data byte 298.

Compare logic 1002 also generates an all_ones signal 1048A that is true if random data byte 298 contains all one bits.

Compare logic 1002 also generates a leading_ones signal 1036A that is true if random data byte 298 contains leading one bits.

Compare logic 1002 also generates a trailing_ones signal 1038A that is true if random data byte 298 contains trailing one bits.

String filter 224 also includes a first counter 1016A for storing the current count of contiguous one bits. In one embodiment, counter 1016A comprises a six-bit register. The output of counter 1016A is a ones_cnt signal 1024A.

String filter 224 also includes a first adder 1012A that adds num_leading_ones 1022A and ones_cnt signal 1024A to produce a new_ones_cnt signal 1026A.

String filter also includes a first four-input mux 1014A. Mux 1014A receives on its inputs ones_cnt signal 1024A, new_ones_cnt signal 1026A, num_trailing_ones signal 1028A, and a hard-coded value of zero 1032A. Mux 1014A selects one of the inputs for outputting to counter 1016A based on a one_select signal 1042A.

Compare logic 1002 generates a num_leading_zeros signal 1022B that specifies the number of leading zero bits in random data byte 298.

Compare logic 1002 generates a num_trailing_zeros signal 1028B that specifies the number of trailing zero bits in random data byte 298.

Compare logic 1002 also generates an all_zeros signal 1048B that is true if random data byte 298 contains all zero bits.

Compare logic 1002 also generates a leading_zeros signal 1036B that is true if random data byte 298 contains leading zero bits.

Compare logic 1002 also generates a trailing_zeros signal 1038B that is true if random data byte 298 contains trailing zero bits.

String filter 224 also includes a second counter 1016B for storing the current count of contiguous zero bits. In one embodiment, counter 1016B comprises a six-bit register. The output of counter 1016B is a zeros_cnt signal 1024B.

String filter 224 also includes a second adder 1012B that adds num_leading_zeros 1022B and zeros_cnt signal 1024B to produce a new_zeros_cnt signal 1026B.

String filter also includes a second four-input mux 1014B. Mux 1014B receives on its inputs zeros_cnt signal 1024B, new_zeros_cnt signal 1026B, num_trailing_zeros signal 1028B, and a hard-coded value of zero 1032B. Mux 1014B selects one of the inputs for outputting to counter 1016B based on a zero_select signal 1042B.

String filter 224 also includes a first comparator 1046A that compares new_ones_cnt signal 1026A with max_cnt signal 258 of FIG. 2. If new_ones_cnt signal 1026A is greater than max_cnt signal 258, then comparator 1046A generates a true value on ones_exceeded signal 1034A; otherwise, comparator 1046A generates a false value on ones_exceeded signal 1034A.

String filter 224 also includes a second comparator 1046B that compares new_zeros_cnt signal 1026B with max_cnt signal 258 of FIG. 2. If new_zeros_cnt signal 1026B is greater than max_cnt signal 258, then comparator 1046B generates a true value on zeros_exceeded signal 1034B; otherwise, comparator 1046B generates a false value on zeros_exceeded signal 1034B.

String filter 224 also includes a two-input OR gate 1004 whose inputs are coupled to the outputs of comparator 1046A and comparator 1046B. OR gate 1004 receives ones_exceeded signal 1034A and zeros_exceeded signal 1034B on its inputs. OR gate 1004 generates a max_cnt_exceeded signal 1044, which is provided as an input to select logic 1006.

String filter 224 also includes a two-input AND gate 1008 coupled to OR gate 1004. AND gate 1008 receives max_cnt_exceeded signal 1044 from OR gate 1004 on one input and filter enable signal 262 of FIG. 2 on its other input. The output of AND gate 1008 is filter fail signal 256 of FIG. 2.

String filter 224 also includes select logic 1006 coupled to receive all_ones signal 1048A, leading_ones signal 1036A, trailing_ones signal 1038A, max_cnt_exceeded signal 1044, leading_zeros signal 1036B, trailing_zeros signal 1038B, and all_zeros signal 1048B. Select logic 1006 generates one_select signal 1042A and zero_select signal 1042B according to the following code:

```
retain_counts = max_cnt_exceeded & filter enable;
increment_zeros = all_zeros & (! retain_counts);
load_zeros = trailing_zeros & (! retain_counts) & (! increment_zeros);
clear_zeros = (! retain_counts) & (! increment_zeros) & (! load_zeros);
increment_ones = all_ones & (! retain_counts);
load_ones = trailing_ones & (! retain_counts) & (! increment_ones);
clear_ones = (! retain_counts) & (! increment_ones) & (! load_ones);
if (retain_counts) {
    zero_select = 3; // select zeros_cnt input
} else if (increment_zeros) {
    zero_select = 2; // select new_zeros_cnt input
} else if (load_zeros) {
    zero_select = 1; // select num_trailing_zeros input
} else if (clear_zeros) {
    zero_select = 0; // select hard-coded 0 input
}
if (retain_counts) {
    one_select = 3; // select ones_cnt input
} else if (increment_ones) {
    one_select = 2; // select new_ones_cnt input
} else if (load_ones) {
    one_select = 1; // select num_trailing_ones input
} else if (clear_ones) {
    one_select = 0; // select hard-coded 0 input
}
```

Figure 11:
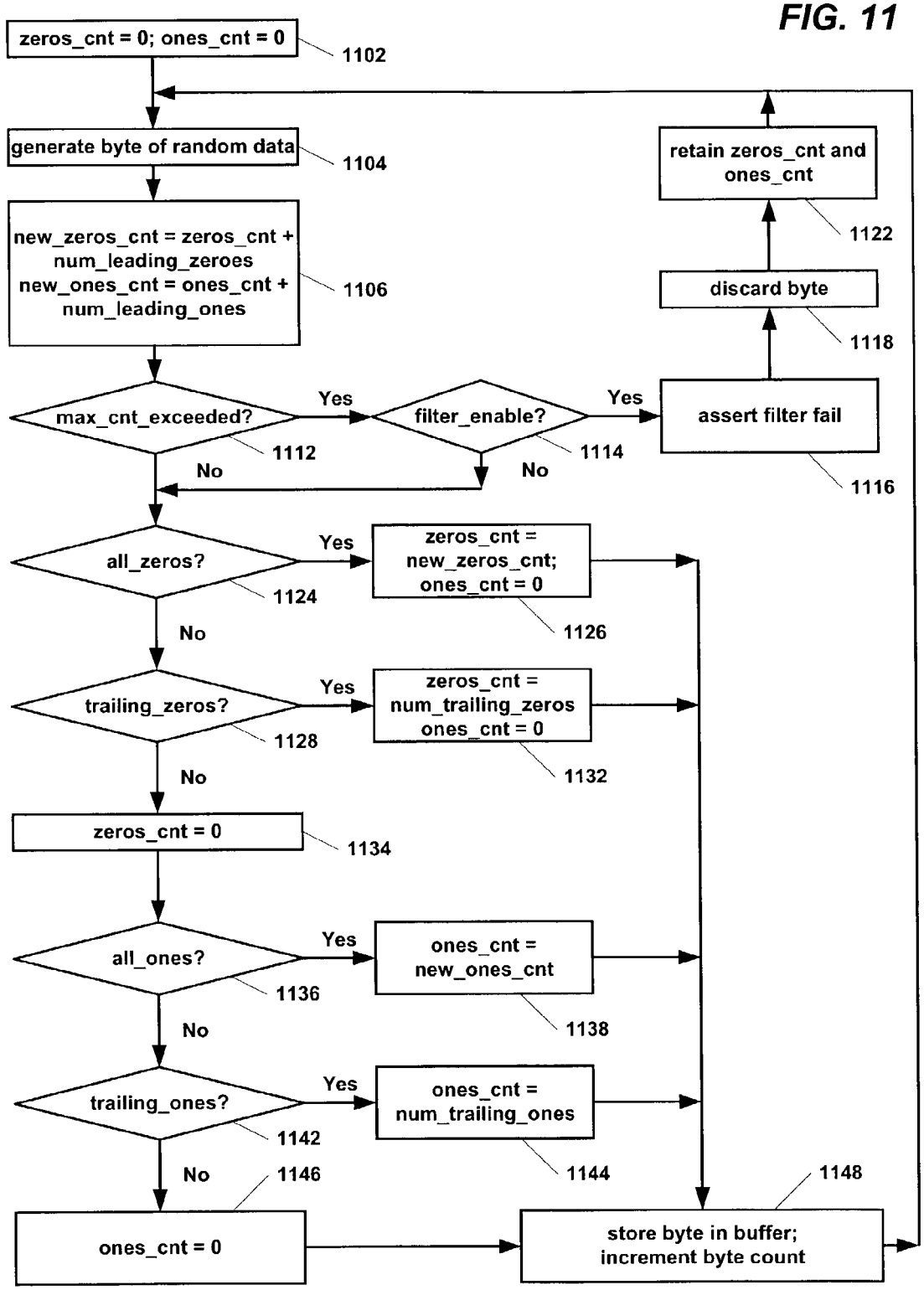
FIG. 11 is a flowchart illustrating operation of the string filter of FIG. 10 according to the present invention.

Referring now to FIG. 11, a flowchart illustrating operation of string filter 224 of FIG. 10 according to the present invention is shown. Flow begins at block 1102.

At block 1102, counters 1016A and 1016B are initialized to a zero value. Flow proceeds to block 1104.

At block 1104, RNG unit 136 of FIG. 1 generates a byte of random data on random byte signal 298 of FIG. 2 and compare logic 1002 generates its signals based on examination of random data byte 298. Flow proceeds to block 1106.

At block 1106, adder 1012A adds num_leading_ones 1022A and ones_cnt 1024A to produce new_ones_cnt 1026A and adder 1012B adds num_leading_zeros 1022B and zeros_cnt 1024B to produce new_zeros_cnt 1026B. Flow proceeds to decision block 1112.

At block 1112, select logic 1006 examines max_cnt_exceeded 1044 to determine whether the number of contiguous zeros or ones has exceeded max_cnt 298. If so, flow proceeds to decisions block 1114. Otherwise, flow proceeds to decision block 1124.

At decision block 1114, AND gate 1008 examines filter enable 262 signal to determine whether string filter 224 is enabled. If so, AND gate 1008 generates a true value on filter fail signal 256 of FIG. 2. Flow proceeds to block 1118.

At block 1118, in response to filter fail signal 256 being true, control logic 244 does not assert the increment signal 221 of FIG. 2 and does not cause random byte 298 to be loaded into buf0 242 or buf1 246, even though shift register 218 has generated a true value on byte_generated signal 282. Thus, RNG unit 136 discards random byte 298 since random byte 298 has caused the number of contiguous ones or zeros to exceed max_cnt 258. Flow proceeds to block 1122.

At block 1122, select logic 1006 generates a value of 3 on one_select signal 1042A and on zero_select signal 1042B in order to cause muxes 1014A and 1014B, respectively, to retain the current ones_cnt 1024A and zeros_cnt 1024B, respectively. Flow returns to block 1104.

At decision block 1124, select logic 1006 examines all_zeros signal 1048B to determine whether random data byte 298 contains all zeros. If so, flow proceeds to block 1126. Otherwise, flow proceeds to decision block 1128.

At block 1126, select logic 1006 generates a value of 2 on zero_select signal 1042B to cause mux 1014B to select new_zeros_cnt 1026B and generates a value of 0 on one_select signal 1042A to cause mux 1014A to select hard-coded 0 input 1032A. Flow proceeds to block 1148.

At decision block 1128, select logic 1006 examines trailing_zeros signal 1038B to determine whether random data byte 298 contains any trailing_zeros. If so, flow proceeds to block 1132. Otherwise, flow proceeds to block 1134.

At block 1132, select logic 1006 generates a value of 1 on zero_select signal 1042B to cause mux 1014B to select num_trailing_zeros 1028B and generates a value of 0 on one_select signal 1042A to cause mux 1014A to select hard-coded 0 input 1032A. Flow proceeds to block 1148.

At block 1134, select logic 1006 generates a value of 0 on zero_select signal 1042B to cause mux 1014B to select hard-coded 0 input 1032B. Flow proceeds to decision block 1136.

At decision block 1136, select logic 1006 examines all_ones signal 1048A to determine whether random data byte 298 contains all ones. If so, flow proceeds to block 1138. Otherwise, flow proceeds to decision block 1142.

At block 1138, select logic 1006 generates a value of 2 on one_select signal 1042A to cause mux 1014A to select new_ones_cnt 1026A. Flow proceeds to block 1148.

At decision block 1142, select logic 1006 examines trailing_ones signal 1038A to determine whether random data byte 298 contains any trailing ones. If so, flow proceeds to block 1144. Otherwise, flow proceeds to block 1146.

At block 1144, select logic 1006 generates a value of 1 on one_select signal 1042A to cause mux 1014A to select num_trailing_ones 1028A. Flow proceeds to block 1148.

At block 1146, select logic 1006 generates a value of 0 on one_select signal 1042A to cause mux 1014A to select hard-coded 0 input 1032A. Flow proceeds to block 1148.

At block 1148, control logic 244 causes random data byte 298 to be loaded into buf0 242 or buf1 246 selected by fill_select signal 264 and asserts increment signal 221 to increment cntr0 211 or cntr1 213 selected by fill_select signal 264. Flow returns to block 1104.

Figure 12:
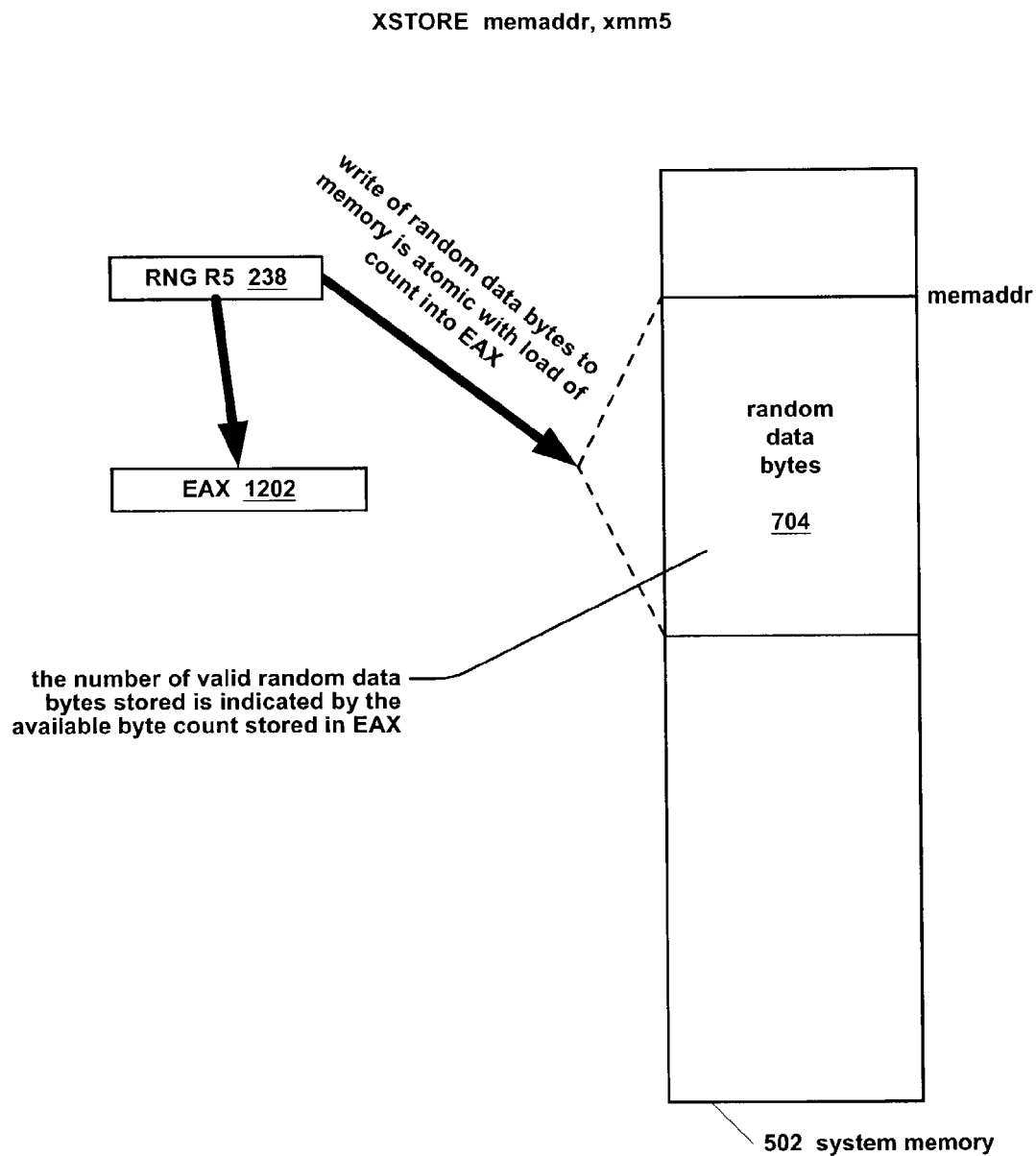
FIG. 12 is a block diagram illustrating operation of the microprocessor of FIG. 1 when executing an XSTORE instruction according to an alternate embodiment of the present invention.

Referring now to FIG. 12, a block diagram illustrating operation of microprocessor 100 of FIG. 1 when executing an XSTORE instruction according to an alternate embodiment of the present invention is shown. The XSTORE instruction of FIG. 12 is similar to the XSTORE instruction of FIG. 7, however in the alternate embodiment, the count of valid random data bytes is loaded into one of the general purpose registers in register file 108, such as the EAX 1202 register, rather than being stored to system memory. Advantageously, like the XSTORE instruction of FIG. 7, the XSTORE instruction of FIG. 12 atomically loads the count into EAX along with storing the random data bytes to memory to facilitate multitasking operation with RNG unit 136. That is, the XSTORE instruction of FIG. 12 is also not interruptible.

Figure 13:
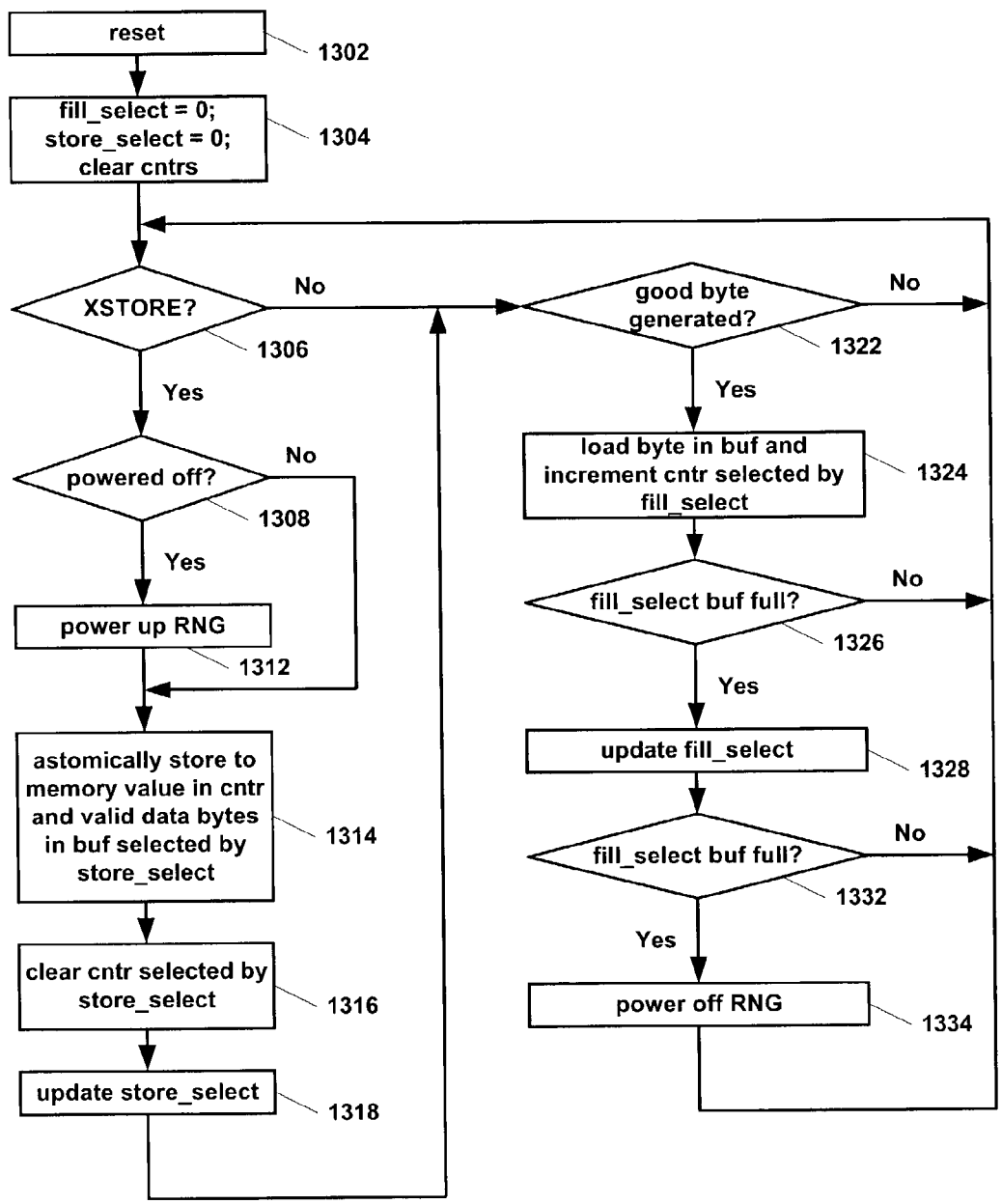
FIG. 13 is a flowchart illustrating multi-buffering operation of the RNG unit of FIG. 2 according to the present invention.

Referring now to FIG. 13, a flowchart illustrating multi-buffering operation of RNG unit 136 of FIG. 2 according to the present invention is shown. Flow begins at block 1302.

At block 1302, reset signal 248 is asserted. Flow proceeds to block 1304.

At block 1304, control logic 244 of FIG. 2 initializes fill_select signal 264 and store_select signal 266 to 0, and clears cntr0 211 and cntr1 213 in response to the reset at block 1302. Flow proceeds to decision block 1306.

At decision block 1306, control logic 244 determines whether an XSTORE instruction is being executed by examining xstore signal 268. If so, flow proceeds to decision block 1308. Otherwise, flow proceeds to decision block 1322.

At decision block 1308, control logic 244 determines whether random bit generator 0 206 or random bit generator 1 208 selected by gen select signal 252 is powered off. If so, flow proceeds to block 1312. Otherwise, flow proceeds to block 1314.

At block 1312, control logic 244 powers up the selected random bit generator via power_cntrl signal 231. Flow proceeds to block 1314.

At block 1314, microprocessor 100 atomically stores to system memory the value in cntr0 211 or cntr1 213 selected by store_select signal 266 and the valid data bytes in buf0 242 or buf1 246 selected by store_select signal 266, according to block 816 of FIG. 8 and as shown in FIG. 7. Flow proceeds to block 1316.

At block 1316, control logic 244 asserts clear signal 223 to clear cntr0 211 or cntr1 213 selected by store_select signal 266. Flow proceeds to block 1318.

At block 1318, control logic 244 updates store_select signal 266 to select the other buffer and counter. In embodiments in which RNG unit 136 includes more than two buffers, store_select signal 266 comprises more than one bit, and updating store_select signal 266 comprises incrementing store_select signal 266 and wrapping around back to zero when incrementing past the number of buffers. Flow proceeds to decision block 1322.

At decision block 1322, control logic 244 determines whether a good random data byte was generated by examining byte_generated signal 282 to see if it is true and examining filter fail signal 256 to see if it is false. If so, flow proceeds to block 1324. Otherwise, flow returns to decision block 1306.

At block 1324, control logic 244 loads the good random data byte into buf0 242 or buf1 246 selected by fill_select signal 264 and increments cntr0 211 or cntr1 213 selected by fill_select signal 264. Flow proceeds to decision block 1326.

At decision block 1326, control logic 244 examines full0 signal 229 or full1 signal 227 specified by fill_select signal 264 to determine whether buf0 242 or buf1 246 selected by fill_select signal 264 is full. If so, flow proceeds to block 1328. Otherwise, flow returns to block 1306.

At block 1328, control logic 244 updates fill_select signal 264. In one embodiment in which RNG unit 136 includes two buffers, updating fill_select signal 264 comprises toggling fill_select signal 264. In embodiments in which RNG unit 136 includes more than two buffers, fill_select signal 264 comprises more than one bit, and updating fill_select signal 264 comprises incrementing fill_select signal 264 and wrapping around back to zero when incrementing past the number of buffers. Flow proceeds to decision block 1332.

At decision block 1332, control logic 244 examines full0 signal 229 or full1 signal 227 specified by fill_select signal 264 as updated at block 1328 to determine whether buf0 242 or buf1 246 selected by fill_select signal 264 is full, i.e., to determine whether all the buffers are full. If so, flow proceeds to block 1334. Otherwise, flow returns to block 1306.

At block 1334, control logic 244 powers off random bit generator 0 206 and random bit generator 1 208 via power_cntrl signal 231 since all the buffers are full. Flow returns to decision block 1306.

Figure 14:
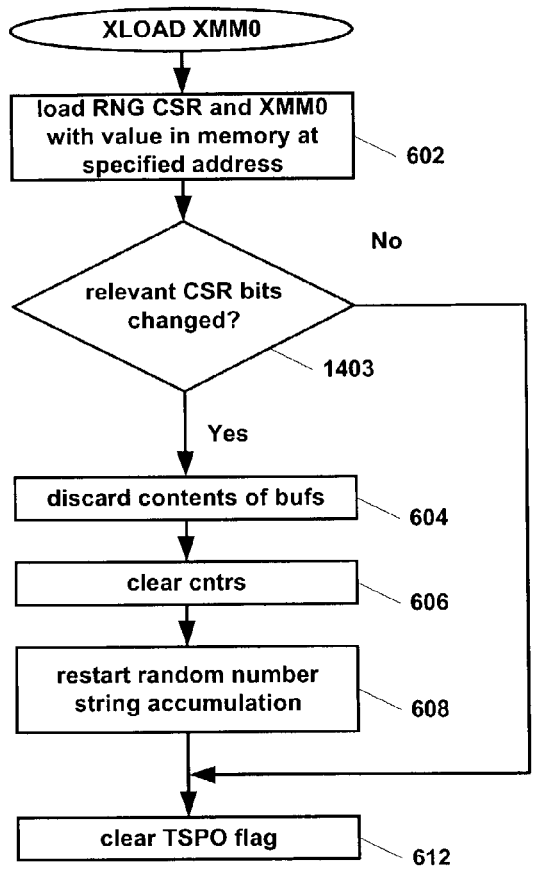
FIG. 14 is a flowchart illustrating operation of the microprocessor of FIG. 1 when executing an XLOAD instruction according to an alternate embodiment of the present invention.

Referring now to FIG. 14, a flowchart illustrating operation of microprocessor 100 of FIG. 1 when executing an XLOAD instruction of FIG. 3 according to an alternate embodiment of the present invention is shown. The flowchart of FIG. 14 is identical to the flowchart of FIG. 6 and like numbered blocks are the same, except that FIG. 14 includes an additional decision block 1403. Flow proceeds from block 602 to decision block 1403. At decision block 1403, control logic 244 of FIG. 2 determines whether relevant bits in CSR 226 have been changed by the load of CSR 226 at block 602. If so flow proceeds to block 604 as in FIG. 6. Otherwise, flow proceeds to block 612, as shown.

The alternate embodiment has the advantage of not unnecessarily discarding already accumulated random bytes and restarting random byte accumulation. That is, if the load of CSR 226 did not change any of the values affecting the generation of random numbers by RNG unit 136, then there is no need to discard already accumulated random bytes and restart random byte accumulation since the random bytes were generated using the desired control values. In one embodiment, the relevant CSR 226 bits are string filter enable bit 334, gen select bit 336, CNT enable bit 342, and string filter max_cnt 346.

Figure 15:
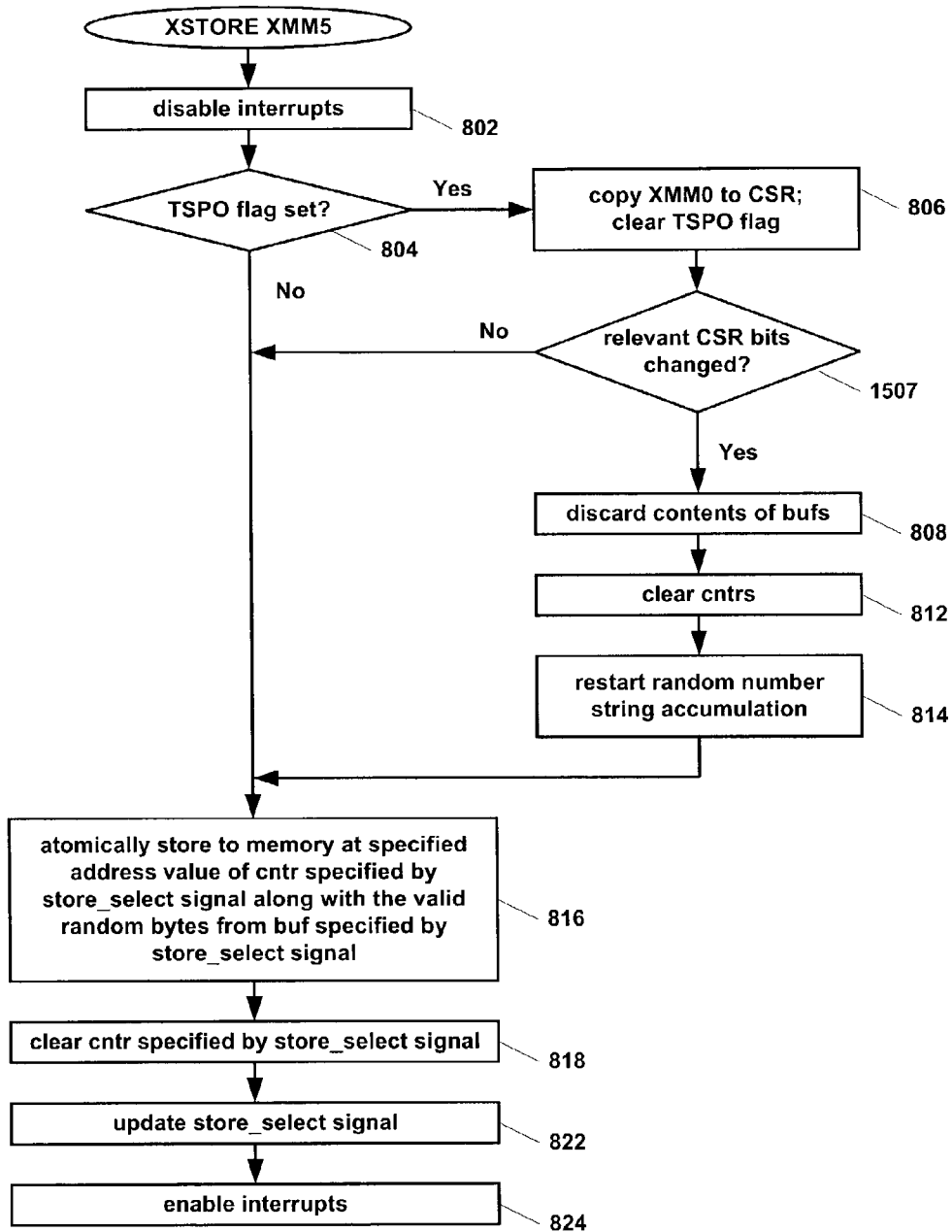
FIG. 15 is a flowchart illustrating operation of the microprocessor of FIG. 1 when executing an XSTORE instruction according to an alternate embodiment of the present invention.

Referring now to FIG. 15, a flowchart illustrating operation of microprocessor 100 of FIG. 1 when executing an XSTORE instruction of FIG. 3 according to an alternate embodiment of the present invention is shown. The flowchart of FIG. 15 is identical to the flowchart of FIG. 8 and like numbered blocks are the same, except that FIG. 15 includes an additional decision block 1507. Flow proceeds from block 806 to decision block 1507. At decision block 1507, control logic 244 of FIG. 2 determines whether relevant bits in CSR 226 have been changed by the copy to CSR 226 at block 806. If so flow proceeds to block 808 as in FIG. 8. Otherwise, flow proceeds to block 816, as shown. The alternate embodiment has the advantage of not unnecessarily discarding already accumulated random bytes and restarting random byte accumulation. That is, if the copy to CSR 226 did not change any of the values affecting the generation of random numbers by RNG unit 136, then there is no need to discard already accumulated random bytes and restart random byte accumulation since the random bytes were generated using the desired control values. In one embodiment, the relevant CSR 226 bits are string filter enable bit 334, gen select bit 336, CNT enable bit 342, and string filter max_cnt 346.

Figure 16:
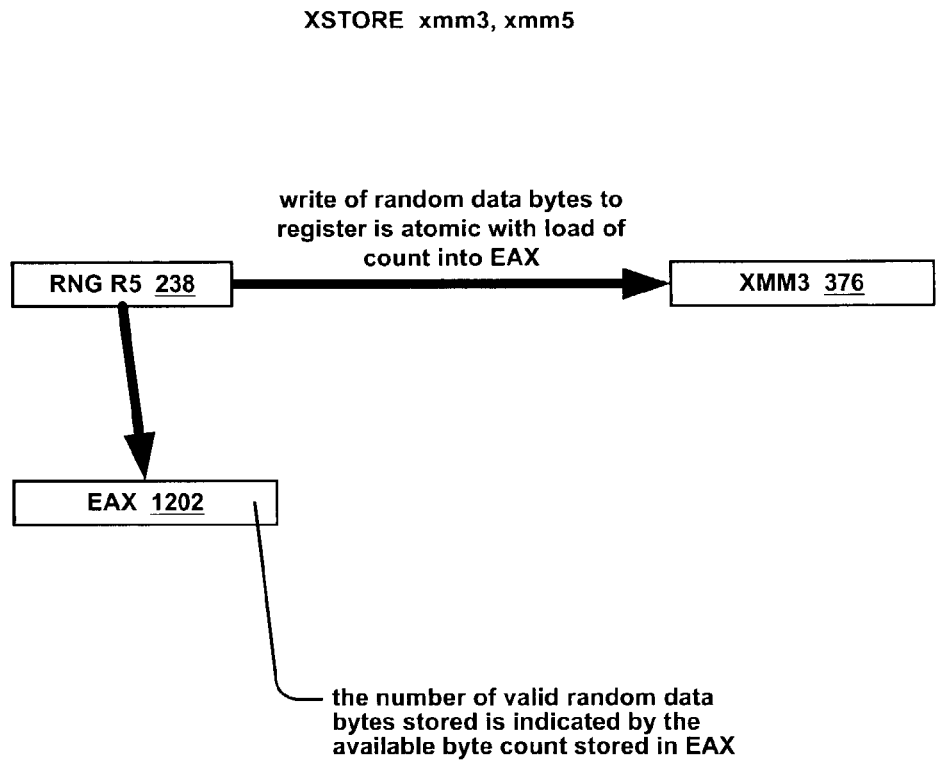
FIGS. 16 and 17 are block diagrams illustrating operation of the microprocessor of FIG. 1 when executing an XSTORE instruction according to alternate embodiments of the present invention.

Referring now to FIG. 16, a block diagram illustrating operation of microprocessor 100 of FIG. 1 when executing an XSTORE instruction according to an alternate embodiment of the present invention is shown. The XSTORE instruction of FIG. 16 is similar to the XSTORE instruction of FIG. 12, however in the alternate embodiment of FIG. 16, the destination operand of the XSTORE instruction of FIG. 16 specifies a register of microprocessor 100, such as an XMM register or a floating-point register or an MMX register or one of the integer unit registers, such as EBX, rather than specifying an address in system memory. That is, the valid random data bytes are atomically written into one of the user-visible registers in register file 108, rather than being stored to system memory. In the example of FIG. 16, the XSTORE instruction specifies the XMM3 register 376 register of SSE registers 352 of FIG. 3 to write the valid random data bytes into, as shown. Advantageously, like the XSTORE instruction of FIG. 12, the XSTORE instruction of FIG. 16 atomically writes the random data bytes into the user-visible register along with loading the count to EAX 1202 to facilitate multitasking operation with RNG unit 136. That is, the XSTORE instruction of FIG. 16 is also not interruptible.

Figure 17:
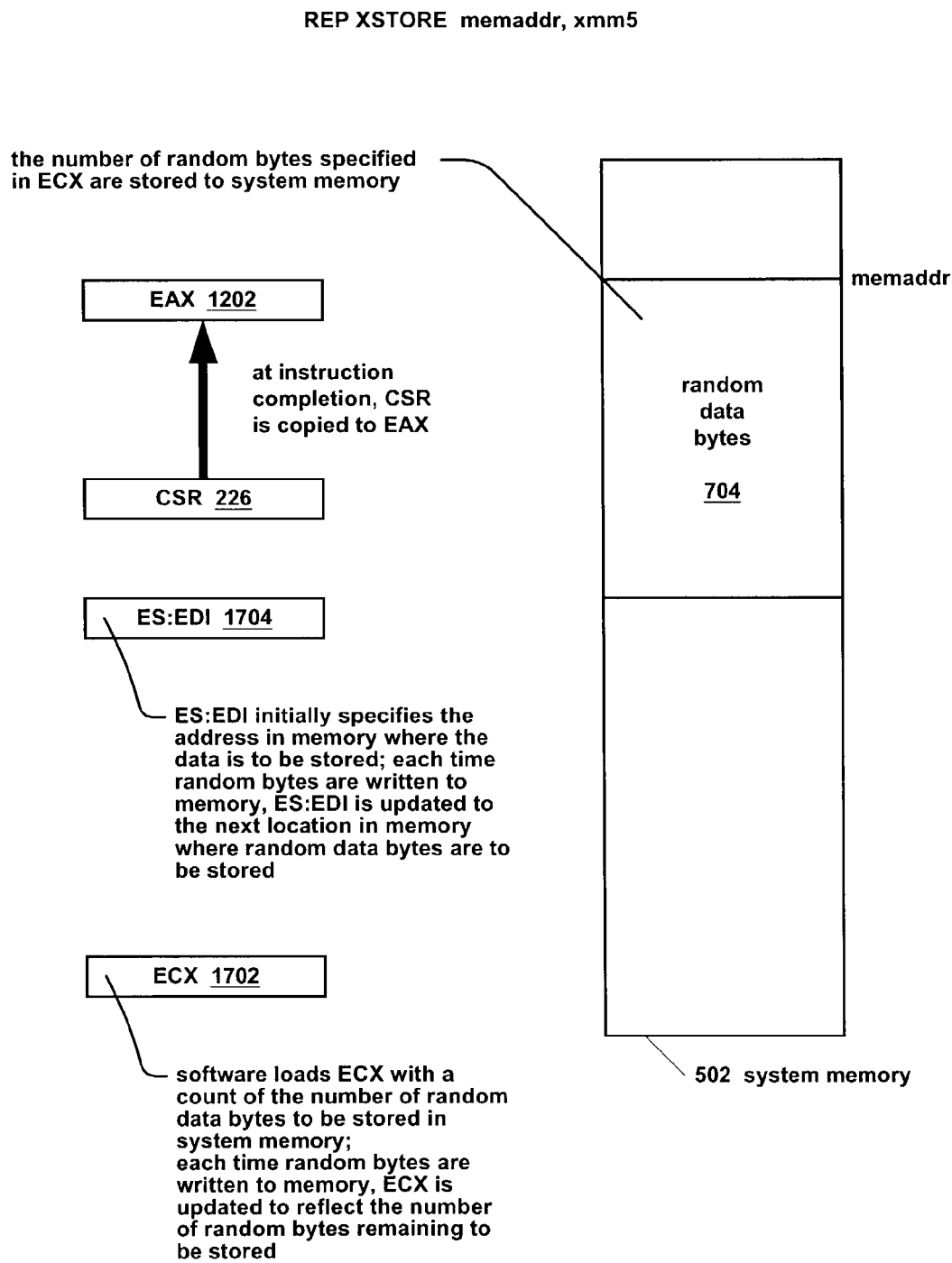

Referring now to FIG. 17, a block diagram illustrating operation of microprocessor 100 of FIG. 1 when executing an XSTORE instruction according to an alternate embodiment of the present invention is shown. The XSTORE instruction of FIG. 17 is similar to the XSTORE instruction of FIG. 12, however in the alternate embodiment of FIG. 17, the XSTORE instruction includes an x86 architecture REP prefix. With the REP XSTORE instruction, the count of bytes of random data to be stored to system memory is specified as an input parameter in the ECX register 1702 of register file 108, as shown. Software loads into ECX 1702 the desired count of random data bytes to be stored to system memory prior to executing the REP XSTORE instruction.

In one embodiment, the REP XSTORE is interruptible between stores of random data bytes to system memory. The memory address is initially specified in general purpose registers of register file 108. In the example of FIG. 17, the memory address is specified in ES:EDI 1704 of register file 108, as shown. Each time one or more random data bytes are written to system memory, ES:EDI 1702 is updated to the next location in system memory where the random data bytes are to be stored. Additionally, each time one or more random data bytes are stored to system memory, ECX 1702 is updated to reflect the number of random bytes remaining to be stored. Assume, for example, a REP XSTORE instruction specifies in ECX 1702 a byte count of 28 and a memory address of 0x12345678. Assume the RNG unit 136 has 8 bytes available in one of buf0 242 and buf1 246 and writes the 8 bytes to system memory while more random data bytes are accumulating. When the 8 are written to memory, ECX 1702 is updated to 20 to indicate that 20 more random data bytes must be written to system memory. Additionally, the address is updated to 0x12345680 as the next location in system memory where the next chunk of random data bytes will be written. An interrupt may occur at this point, and software can examine the updated values. When the interrupt has been serviced and control is returned to the REP XSTORE instruction, the REP XSTORE will resume execution using the updated values in ECX 1702 and ES:EDI 1704. In addition, at completion of the REP XSTORE instruction, the current value of CSR 226 of FIG. 2 is copied to the EAX register 1202 of register file 108.

Although the present invention and its objects, features, and advantages have been described in detail, other embodiments are encompassed by the invention. For example, although the invention has been described with reference to SSE registers which are saved and restored by the operating system, the invention is adaptable to employ other registers that are saved and restored by the operating system to determine whether a possible task switch has occurred and to restore the control register in the random number generator, such as floating point registers. Also, although the invention has been described with respect to x86 architecture processors, the invention is adaptable to various processor architectures.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor, for running a multitasking operating system, the microprocessor having a memory coupled thereto, the microprocessor comprising:
   a register, saved and restored by the operating system on a task switch;
   a flag register, coupled to said register, for storing a flag which if set indicates a task switch possibly occurred, wherein the microprocessor sets said flag when it executes an instruction that loads said register; and
   a random number generator (RNG), coupled to said register, for generating random numbers based on one or more control values stored in a control register, wherein said control register is not saved and restored by the operating system on a task switch, wherein the microprocessor includes a first instruction for loading said values into said control register and also for loading said values into said register, wherein the microprocessor also includes a second instruction for storing said random numbers to the memory, and for copying said values from said register to said control register if said flag is set.

2. The microprocessor of claim 1, wherein said register comprises an SSE register.

3. The microprocessor of claim 1, wherein said register comprises an MMX register.

4. The microprocessor of claim 1, wherein said register comprises an FPU register.

5. The microprocessor of claim 1, wherein the microprocessor clears said flag after said copying said contents of said register to said control register.

6. The microprocessor of claim 1, wherein the microprocessor clears said flag after said loading said value into said control register and said register.

7. The microprocessor of claim 1, wherein said one or more control values comprise a value for selectively enabling/disabling a filter in said RNG.

8. The microprocessor of claim 7, wherein said filter comprises a filter for preventing generation of a string of N contiguous like bits in said random numbers.

9. The microprocessor of claim 8, wherein said one or more control values specify said N.

10. The microprocessor of claim 1, wherein said one or more control values select one of two or more random bit generators comprised in said random number generator for generating random bits for accumulating into said random numbers.

11. The microprocessor of claim 1, wherein said one or more control values selectively enable/disable said RNG to generate said random numbers.

12. The microprocessor of claim 1, wherein said one or more control values selectively enable/disable a continuous number test of said RNG.

13. The microprocessor of claim 1, wherein said one or more control values selectively enable/disable a self-test of said RNG.

14. The microprocessor of claim 1, wherein said one or more control values selectively enable/disable a bit whitener in said RNG.

15. The microprocessor of claim 1, wherein said one or more control values specify a direct current bias voltage for partially controlling an operating voltage of oscillators for producing random bits in said RNG.

16. The microprocessor of claim 1, further comprising:
a counter, comprised in said RNG, for maintaining a count of valid bytes comprising said random numbers.

17. The microprocessor of claim 16, wherein said second instruction stores said count in addition to storing said random numbers to the memory.

18. The microprocessor of claim 17, wherein said second instruction stores said count to the memory.

19. The microprocessor of claim 17, wherein said second instruction stores said count to a user-visible register within the microprocessor.

20. The microprocessor of claim 17, wherein said second instruction atomically performs said store of said count and said store of said random numbers.

21. The microprocessor of claim 17, wherein if said flag is set, the microprocessor clears said count prior to said store of said count.

22. The microprocessor of claim 21, wherein said count may be zero.

23. The microprocessor of claim 17, wherein the microprocessor clears said count only if said copying changes said one or more control values in said control register.

24. The microprocessor of claim 1, wherein said second instruction is uninterruptible.

25. The microprocessor of claim 1, wherein if said flag is set, the microprocessor restarts generation of said random numbers based on said contents copied to said control register from said register.

26. The microprocessor of claim 25, wherein the microprocessor restarts generation of said random numbers based on said contents only if said copying changes said one or more control values in said control register.

27. The microprocessor of claim 1, wherein if said flag is set, the microprocessor discards said random numbers that were generated prior to said copying said values from said register to said control register.

28. The microprocessor of claim 27, wherein the microprocessor discards said random numbers only if said copying changes said one or more control values in said control register.

29. The microprocessor of claim 1, wherein the microprocessor sets said flag when it executes an instruction that loads said register only if said instruction loads said register from the memory.

* * * * *